United States Patent
Kuo et al.

(10) Patent No.: US 10,411,810 B2
(45) Date of Patent: Sep. 10, 2019

(54) RECEIVER WITH MUTUALLY COHERENT OPTICAL FREQUENCY COMBS

(71) Applicant: THE REGENTS OF THE UNIVERSITY OF CALIFORNIA, Oakland, CA (US)

(72) Inventors: Ping Piu Kuo, San Diego, CA (US); Stojan Radic, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/642,120

(22) Filed: Jul. 5, 2017

(65) Prior Publication Data

US 2018/0006730 A1    Jan. 4, 2018

Related U.S. Application Data

(60) Provisional application No. 62/358,120, filed on Jul. 4, 2016.

(51) Int. Cl.
*H04J 14/02* (2006.01)
*H04B 10/61* (2013.01)

(52) U.S. Cl.
CPC ......... *H04B 10/616* (2013.01); *H04B 10/615* (2013.01); *H04J 14/02* (2013.01); *G02F 2203/56* (2013.01); *H04B 2210/006* (2013.01)

(58) Field of Classification Search
CPC ................ H04B 10/616; H04B 10/615; H04B 2210/006; H04J 14/02; G02F 2203/56
USPC ......................................................... 398/79
See application file for complete search history.

(56) References Cited

U.S. PATENT DOCUMENTS

| | | | |
|---|---|---|---|
| 5,210,631 | A | 5/1993 | Huber et al. |
| 5,963,567 | A | 10/1999 | Veselka et al. |
| 6,590,910 | B2 | 7/2003 | Lin |
| 6,879,433 | B1 | 4/2005 | Yamashita et al. |
| 6,920,263 | B2 | 7/2005 | Tadakuma et al. |

(Continued)

OTHER PUBLICATIONS

Ataie, v., et al., "Ultrafast Absolute Ranging by Coherent Parametric Comb," in Optical Fiber Communication Conference, OSA Technical Digest (online) (Optical Society of America, 2013), paper OTh3D.2.

(Continued)

*Primary Examiner* — Don N Vo
(74) *Attorney, Agent, or Firm* — Eleanor Musick; Musick Davison, LLP

(57) ABSTRACT

A receiver architecture for physically-assisted computing of transforms, such as discrete Fourier transforms (DFT) and discrete Hilbert transforms (DHT), employs mutually-coherent optical frequency combs for detection of the coherent beating between an optical signal and a reference optical tone generated by a local oscillator (LO). A signal replication mixer generates a plurality of signal optical tones having a frequency pitch with an input signal mapped thereon. A reference mixer (local oscillator) generates a plurality of reference optical tones having an offset frequency pitch relative to the signal tones. A receiver backplane detects coherent beating between the signal optical tones and the reference optical tones. The input signal may be in the optical domain or in the radio-frequency domain.

25 Claims, 18 Drawing Sheets
(10 of 18 Drawing Sheet(s) Filed in Color)

(56) References Cited

U.S. PATENT DOCUMENTS

| | | | |
|---|---|---|---|
| 7,068,943 B2 | 6/2006 | Korolev et al. | |
| 7,099,541 B2 | 8/2006 | Terahara et al. | |
| 7,164,526 B2 | 1/2007 | McKinstrie et al. | |
| 7,245,833 B1 | 7/2007 | Volkening | |
| 7,315,697 B2 | 1/2008 | Smilanski et al. | |
| 7,336,363 B2* | 2/2008 | Rothenberg | B23K 26/0613 356/450 |
| 7,440,112 B2 | 10/2008 | Kurokawa et al. | |
| 7,483,608 B2 | 1/2009 | Inoue et al. | |
| 7,650,080 B2 | 1/2010 | Yap et al. | |
| 8,275,263 B1 | 9/2012 | Franklin | |
| 8,447,155 B1 | 5/2013 | Kuo et al. | |
| 8,451,528 B1 | 5/2013 | Kuo | |
| 8,611,759 B1 | 12/2013 | Kvavle et al. | |
| 9,106,325 B2 | 8/2015 | Ataie et al. | |
| 9,287,993 B1 | 3/2016 | Adleman et al. | |
| 2002/0071454 A1 | 6/2002 | Lin | |
| 2002/0164135 A1 | 11/2002 | Tadakuma et al. | |
| 2003/0026527 A1 | 2/2003 | Takahashi et al. | |
| 2004/0184815 A1 | 9/2004 | Korolev et al. | |
| 2005/0129412 A1 | 6/2005 | Centanni et al. | |
| 2006/0002715 A1 | 1/2006 | Igarashi et al. | |
| 2006/0061853 A1 | 3/2006 | Chraplyvy et al. | |
| 2007/0206950 A1 | 9/2007 | Liu et al. | |
| 2007/0280613 A1 | 12/2007 | Inoue et al. | |
| 2008/0226301 A1 | 9/2008 | Alic et al. | |
| 2008/0285606 A1 | 11/2008 | Kippenberg et al. | |
| 2009/0079967 A1 | 3/2009 | Radic | |
| 2010/0284431 A1 | 11/2010 | Inoue | |
| 2012/0257270 A1 | 10/2012 | Kuo et al. | |
| 2013/0051807 A1 | 2/2013 | Huang et al. | |
| 2013/0223459 A1 | 8/2013 | Radic | |
| 2013/0259490 A1* | 10/2013 | Malouin | H04B 10/6166 398/152 |
| 2013/0314767 A1 | 11/2013 | Kuo et al. | |
| 2014/0253915 A1 | 9/2014 | Ataie et al. | |
| 2014/0254619 A1 | 9/2014 | Ataie et al. | |
| 2014/0270783 A1 | 9/2014 | Prather et al. | |
| 2014/0341265 A1 | 11/2014 | Alic et al. | |
| 2017/0019178 A1 | 1/2017 | Alic et al. | |
| 2017/0049381 A1 | 2/2017 | Lieber et al. | |
| 2017/0115333 A1* | 4/2017 | Radic | G01R 23/20 |
| 2017/0138791 A1* | 5/2017 | Burghoff | G01J 3/28 |

OTHER PUBLICATIONS

Wiberg et al.; "Coherent Filterless Wideband Microwave/Millimeter-Wave Channelizer Based on Broadband Parametric Mixers"; Journal of Lightwave Technology, vol. 32, No. 20, Oct. 15, 2014, pp. 3609-3617.

Bres, C-S., et al.; "Reconfigurable parametric channelized receiver for instantaneous spectral analysis", Optic Express, Feb. 14, 2011, vol. 19, No. 4, pp. 3531-3541.

Coddinton, I., et al.; "Rapid and precise absolute distance measurements at long range", Nature Photonics, Jun. 2009, vol. 3, pp. 351-356.

Huynh, C.K., et al.; "Noise performance of phase-insensitive multicasting in multi-stage parametric mixers", Optics Express, Jan. 14, 2013, vol. 21, No. 1, pp. 804-814.

Myslivets, E. et al., "Generation of wideband frequency combs by continuous-wave seeding of multistage mixers with synthesized dispersion," Optics Express, Jan. 30, 2012, vol. 20, No. 3, pp. 3331-3344.

Kuo, B.P-P, et al.; "Wideband Parametric Frequency Comb as Coherent Optical Carrier," J. Lightwave Technology, Nov. 1, 2013, vol. 31, No. 21, pp. 3414-3419.

Radic, S.; "Parametric signal processing", IEEE Journal of Selected Topics in Quantum Electronics, Mar./Apr. 2012, vol. 18, No. 2, pp. 670-680. 2012.

Temprana, E., et al.; "Low-noise parametric frequency comb for continuous C-plus-L-band 16-QAM channels generation," Opt. Express 22, 6822-6828 (2014).

Bernhardt, B., et al.; "Cavity-enhanced dual-comb spectroscopy", Nature Photonics, Nov. 29, 2009 (published on-line), 4, 55-57.

Tong, Z. et al.; "Spectral linewidth preservation in parametric frequency combs seeded by dual pumps", Optics Express, 20(16) Jul. 30, 2012, 17610-17619.

Coddington, I., et al.; "Coherent Multiheterodyne Spectroscopy Using Stabilized Optical Frequency Combs", Physical Review Letters, Jan. 11, 2008, vol. 100, 13902-1-13902-4.

Gohle, C., et al.; Frequency Comb Vernier Spectroscopy for Broadband, High-Resolution, High-Sensitivity Absorption and Dispersion Spectra, Physical Rev. Letters, Dec. 31, 2007, vol. 99, 263902-1-263901-4.

* cited by examiner

RECEIVER WITH MUTUALLY COHERENT OPTICAL FREQUENCY COMBS

RELATED APPLICATIONS

This application claims the benefit of the priority of U.S. Provisional Application No. 62/358,120, filed Jul. 4, 2016, the disclosure of which is incorporated herein by reference in its entirety.

FIELD OF THE INVENTION

The present invention relates to a hybrid, photonics-assisted receiver architecture based on mutually-coherent frequency combs.

BACKGROUND OF THE INVENTION

Discrete Fourier Transform (DFT) processors are one the most important class of specialized computing engines used for signal and image processing in disciplines ranging from electronic warfare (EW), cyber-security, optical and wireless communications, image processing and spectroscopy. Conventional DFT processor implementation rests on reduced-complexity algorithms such as split-radix FFT (SRFFT) that approach the lower bound on number of multiplications predicted by Winograd (*Mathematics of Computation*, 32(141):175-199, 1978). However, a typical 256-bit FFT operation still uses approximately 2000 real multiples and more than 4000 additions (H. Sorensen et al., *IEEE Transactions on Acoustics, Speech and Signal Processing*, Vol. 34, pp. 152 1986). The multiplier operation carries the largest energy cost in modern digital signal processor (DSP) architecture: it is nearly 300% more expensive than the addition and more than 10 times than a Boolean operation. The energy scaling supported by Moore's law in the past is no longer applicable—while multiplier cost was 1.5 pJ in fast (10-TIOPS) 32 nm-CMOS, the new (12 nm) technology draws only marginally less power (S. Savory, "Digital Signal Processing for Coherent Systems," *OFC/NFOEC Technical Digest*, OTh3C7, 2012). CMOS feature scaling has finally met the gate leakage barrier that prevents, even in principle, achieving low dissipation at high data processing speeds. Indeed, the CMOS gate has become so small that it cannot be effectively switched off. As a consequence, energy-intensive processors (such as multiplier-dominated DFT) are now facing strict speed limit since generated heat cannot be dissipated in practical manner.

In an alternative approach, a Fourier optical processor based on free-space optics (defined as an architecture composed of 3- or 2-dimensional lenses, optical grating and combining elements) can calculate spatial or temporal transform. However, five decades since its initial introduction (J. W. Goodman, *Introduction to Fourier Optics*, McGraw-Hill (1968)), no practical computing architecture using optical co-processor has been implemented or used in commercial systems. Reasons behind this apparent failure are both fundamental and practical; we only point to widely recognized speed and size limits that free-space optics imposes on any architecture. Indeed, even when combined with electrooptical or optomechanical primitives, free-space Fourier systems are large, dissipative and slow in comparison to its modern electronics counterparts.

In one important DFT application, signal detection, classification and interpretation (DCI) across the entire radio-frequency (RF) spectrum poses both fundamental and technological challenges. The advent of fast RF modulation has enabled a diversified family of ultrawideband (UWB) transceivers. The inherent advantages of UWB link include power-efficient transmission, resistance to interference, multipath distortion, and band-reuse. A common feature in all systems, defined by regulations, is large physical bandwidth, exceeding 0.5 GHz in all cases. In practice, this means that a sub-nanosecond pulse is generated and manipulated in order to code channel either in time or frequency domain.

An early UWB approach focused on time-modulated (TM) UWB emitters, resembling, in its simplest form, well-known pulse-position modulation (PPM). In contrast to classical PPM scheme, often used with deep-space optical links, TM-UWB time reference is often dithered by a tailored quasi-random sequence in order to suppress channel spectral density and equalize it across the allocated band. Similarly, a frequency-hopping (FH) coding was also developed, particularly to minimize spectral channel density at "crowded" bands and to provide for adaptive spectral provisioning. In both schemes, strict temporal reference is absent and the correlator plays a critical role within the receiver. An incoherent nature of such UWB link also puts high spectral efficiency coding such as pulse-amplitude (PAM) modulation at distinct disadvantage.

In addition to complying to non-interference regulation, useful wireless transceiver technologies must also bypass multipath propagation, interference from other devices, intentional jamming, and provide either physical or coding security layer. Consequently, conventional (time-referenced) PPM, formed with ultrashort pulses, cannot achieve these requirements. However, if UWB PPM is combined with fast frequency hopping, then goals of regulation-compliant spectral utilization, multi-access links, and low probability of intercept become realistic. The combination of frequency hopping (FH) with PPM could not only eliminate fixed harmonics seen in fixed time-frame TM-UWB, but could also add a level of link security not inherent in adaptive-band UWB links.

The qualities that make FH-PPM modulation attractive also pose a significant reception problem. Firstly, UWB pulses with bandwidth in excess of GHz need to be utilized in order to spread the signal in frequency domain and suppress the spectral power density below the FCC-specified power threshold. Secondly, an introduction of frequency-hopping mandates additional bandwidth at the receiver, in excess of PPM-only detection. While the excess frequency bandwidth requirement can be addressed by incorporating a set of local oscillator's and mixers at the receiver, this solution is not applicable in dissipation-constrained receiver architectures, and particularly those in satellite and remoted devices. Thus, to address the bandwidth challenge, an analog to digital converter (ADC) possessing sufficient speed must be utilized. While possible, at least in principle, the use of high-bandwidth ADC imposes practical challenges for multi-GHz-wide channels. Conversely, when physical bandwidth of FH-PPM link exceeds 10 GHz, this challenge also becomes fundamental as it induces runaway dissipation requirement.

Firstly, high noise figure would be induced due to the need for high-count signal splitting and subsequent amplification. Secondly, precise filter alignment would have to be realized regardless of how fine frequency pitch is required. The latter is in direct conflict with the need for high filter-to-filter isolation necessary to suppress the crosstalk. In contrast, photonic-assisted front-ends have been demonstrated in the past, overcome both the performance and implementation limits. Specifically, the use of modulated optical frequency combs and parametric signal multicasters have been widely studied and have addressed high insertion loss, distortion and frequency programmability challenges.

Pulse position modulation (PPM) has been used in radio-frequency domain to achieve both low-dissipation requirements and provide precision ranging. In ultra-wide band (UWB) architectures, it underpins asynchronous receiver, multiple access environments and interference-resistant transmission. When combined with frequency hopping (FH), it allows for additional level of immunity to jamming and low probability of intercept. Realization of frequency-hopping PPM (FH-PPM) transceiver poses practical challenge, particularly in UWB RF range. With UWB pulses reaching the multi-GHz range, frequency hopping adds to the effective bandwidth at which receiver must be operated, exceeding the performance of modern quantizer and digital demodulation backplane.

Another approach for addressing UWB challenges involves cyclostationary analysis, which lies at the core of EW and signal intelligence (SIGINT) intercept systems (W. A. Gardner, et al., "Cyclostationarity: Half a century of research," *Signal Proc.*, vol. 86, no. 4, pp. 639-697, April 2006). Introduced nearly four decades ago, cyclostationary analysis can intercept and classify a modulated waveform from a background signal such as noise or jamming. To accomplish this, spectral computation must be performed over multiple modulation cycles. The received signal is first digitized using an analog-to-digital converter (ADC) and then subsequently mapped to the Fourier domain (FFT). After the spectral representation is obtained, spectral correlation is computed in order to generate the two-dimensional spectral correlation function (SCF) representation, discriminating the noise. A wideband ADC poses the first processing challenge that can be quantified in terms of precision, operating bandwidth and dissipation. While an ADC capable of contiguous RF range is unlikely to be constructed anytime soon, circuits operating beyond 20 GHz have been reported. If we assume that an RF bandwidth of 100 GHz can be addressed by a combination of multiple ADC stages, such a compound digitizer would still dissipate nearly 100 Watts. Even if this were acceptable in a select set of CS applications, the effective number of bits of such a digitizer would strictly limit its utility. Thus, in practice, current, all-electronics DFT technology limits real-time spectral bandwidth to sub-GHz-scale range—two orders of magnitude below the needs of future EW spectral range (>110 GHz).

Yet another application of DFTs is real-time pattern recognition, which has encountered technology limits in imaging, SIGINT and cyber-defense fields. While image-based pattern recognition is well-known, a less-well known, but equally important challenge is posed by Terabit-per-second-capacity lightwave channel that carries high-capacity terrestrial and submarine fiber data traffic. To analyze an anomalous traffic pattern (such as denial of service or network domain scanning) in such high-capacity fiber link in real time, it is necessary to recognize and intercept a specific bit sequence on the fly (at time scale comparable to the flight of the lightwave packet over few kilometers of fiber). In practical terms, this means that DFT of Terabit-class stream must be computed at "wirespeed", i.e., at a latency that is comparable to a lightwave packet traversing the localized segment of fiber. Currently, any DFT of data traffic is performed off-line (store-and-compute), thus precluding, even in principle, real-time network traffic analysis. A DFT coprocessor capable of real-time, continuous operation that matches a lightwave channel rate would dramatically change the very nature of modern cyber defense strategy The above-described applications provide just a few examples of the significant limitations that electronic- and computation-based approaches to DFT and other transforms have imposed on a wide range of technologies. Accordingly, the need remains for an approach to reduce this computational bottleneck to allow real-time, wideband execution of signal processing algorithms.

BRIEF SUMMARY

According to embodiments of the invention, a method and system perform physically-assisted computation of a transform, for example, DFT or DHT, through the use of mutually coherent frequency combs for frequency decomposition.

Physical access to complex transforms of a received signal eliminates the need for high-rate computation that must match the rate (bandwidth) of the incoming signal. In the example of ordinary (single-carrier) PPM demodulation, the frequency phase slope should be measured to estimate the received pulse position. Consequently, the resolution of the frequency decomposition should be sufficient to provide accurate pulse position estimation: the resolution in this case is directly proportional to the number of frequency comb tones used. Correspondingly, a wideband optical frequency comb with high tone count is superior but imposes distinct implementation challenges. Recognizing this, conventional comb generation techniques such as E/O-generated combs, resonator-seeded combs and mode-locked laser combs impose either limited tone count or prevent frequency reconfigurability. On the other hand, with the advent of shockwave parametric mixers with hundreds of optical comb tone counts readily achievable, and frequency pitch reconfigurability, such mixers are desirable for their use in a comb based FH-PPM receiver. Additionally, any frequency comb that disconnects frequency tone pitch from a need to stabilize highly resonant cavity is also preferred for this implementation. While two combs that are generated using such cavities (resulting in different free-spectral range) can indeed be coherently coupled, this approach mandates an electronic feedback that, depending on optical path can have insufficient bandwidth.

The inventive approach provides means for coherent spectral decomposition of a wide-band, high-speed optical signal, or an electrical signal via electrical/optical conversion, through coherent detection, without the need for narrow-band optical filtering to perform frequency slicing. The spectral decomposition reception architecture according to the invention enables real-time detection of a signal at sub-Nyquist receiver bandwidth. The inventive approach also circumvents the bandwidth-resolution of existing or conceivable analog-to-digital converters (ADCs), and alleviates the need for synthesizing physical channelization filters with excessive spectral isolation. In conventional approach, a perfect reconstruction of channelized signal requires the use of channelizer filters with brick-wall frequency response, which is not physically implementable. The all-DSP (digital signal processing) approach provided by the inventive method for image-rejection in coherent detection guarantees an ideal spectral response of the channelized receiver.

In an exemplary implementation of the inventive approach, a photonics-assisted FH-PPM receiver architecture utilizes mutually coherent frequency combs for frequency decomposition. Recognizing the FH-PPM UWB reception challenge, a new receiver has been developed, with specific goal of eliminating the high-rate electronic front-end. The new architecture rests on the concept of physical spectral decomposition, previously used to detect and reconstruct a random, sub-noise UWB-like pulse. In practical terms, the new receiver relies on lossless, programmable-width, coherent frequency decomposition. While a bank of filters could be utilized to provide contiguous frequency array, such approach would also impose implementation challenges.

The new type of PPM receiver demonstrated herein relies on frequency decomposition by wideband, spectrally-equalized optical frequency combs. Specifically, the received RF signal is first modulated onto an optical carrier (modes of the frequency comb), effectively replicating the electrical field onto a coarsely spaced optical frequency grid. The scheme requires generation of a second optical frequency comb with a different frequency pitch, but with high degree of coherency with the signal-bearing comb. In practical terms, this is accomplished by deriving seed, two-tone input for optical mixer from the same (master) continuous-wave laser (V. Ataie, et al., "Subnoise detection of a fast random event," *Science* 350(6266), pp. 1343-1346 (2015), DOI: 10.1126/science.aac8446). In this Vernier-comb topology, each unmodulated frequency tone overlaps with different spectral section of the signal, in effect covering the entire RF received range. As a result, it is possible to realize a contiguous frequency decomposition of the received field: both the resolution and bin-count is strictly defined by the comb-tone count and difference in frequency pitch. This architecture also allows for free and fast tuning of a comb pitch to address variable-resolution requirement; we note that this would not be possible with a comb anchored with highly-resonant optical cavity. Specifically, the discrete Fourier transform (DFT) coefficients of the electrical spectrum are explicitly measured without a conventional computation step.

In one aspect of the invention, the inventive approach relies on the detection of the coherent beating between an optical signal and an amplitude-and-phase-controlled optical tone generated by a local oscillator. Balanced detection of the optical hybrid outputs produces electrical signals proportional to the modulation signal. This approach decomposes the signal in the frequency domain into components that are substantially more narrow-band than the original signal, each of which is individually detected. Specifically, if a comb has N tones (modes), then DFT of the signal of bandwidth B corresponds to coherent spectral decomposition with the resolution B/DF. The frequency-shifted aggregations of the channels can then be used to reconstruct the received signal.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF EXEMPLARY EMBODIMENTS

While the examples described herein are directed to a discrete Fourier transform (DFT) for simplicity, it should be noted that the inventive approach can be generalized to any transform of interest, including, but not limited to, a discrete Hilbert transform (DHT).

Figure 1:
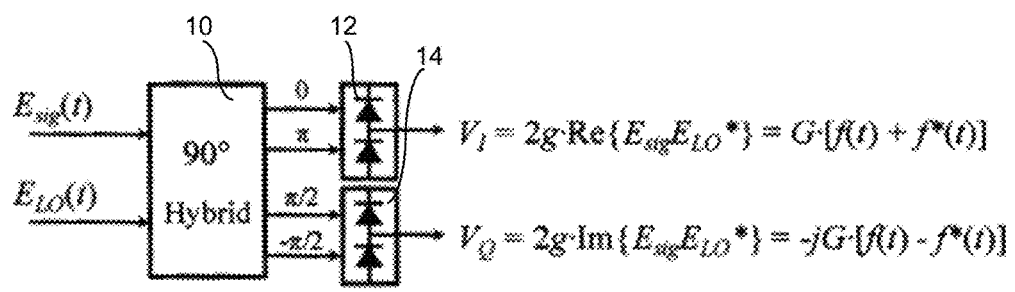
FIG. 1 is a diagram demonstrating optical coherent detection.

In certain aspects, the present invention relies on the detection of the coherent beating between an optical signal and an optical tone generated by a local oscillator (LO). FIG. 1 is a diagram demonstrating optical coherent detection, in which a single detector element receives a signal-local-oscillator pair of tones from two coherently coupled combs. Consider an optical signal $E_{sig}(t)=A_s f(t)\exp(j\omega_c t)$, which is coupled with a LO $E_{LO}(t)=A_L \exp(j\omega_c t)$ using a 90° optical hybrid 10. Subsequent balanced detection of the optical hybrid outputs at detectors 12 and 14 will produce electrical signals $V_I$ and $V_Q$ proportional to the modulation signal f(t), as illustrated in FIG. 1, according to Equations (1) and (2):

$$V_I = 2g \cdot Re\{E_{sig}E_{LO}^*\} = G \cdot [f(t)+f^*(t)] \quad (1)$$

$$V_Q = 2g \cdot Im\{E_{sig}E_{LO}^*\} = -jG \cdot [f(t)+f^*(t)] \quad (2)$$

where I and Q denote the in-phase and quadrature phase component of the modulation signal, respectively, and g and G ($=g|A_sA_{LO}|$) are coherent detection gain coefficients, which are proportional to the conversion gain of the balanced detectors, and the incident power of the signal and LO respectively. It will be readily recognized that full resolution of the modulation signal requires acquisition systems with bandwidths exceeding that of the modulation signal. The requirement can easily be violated in cases where a high data-rate, terabit-per-second (Tb/s) transport is being received, since the bandwidth occupied by a channel of this kind exceeds the capability of known analog-to-digital converters (ADCs).

Figure 2:
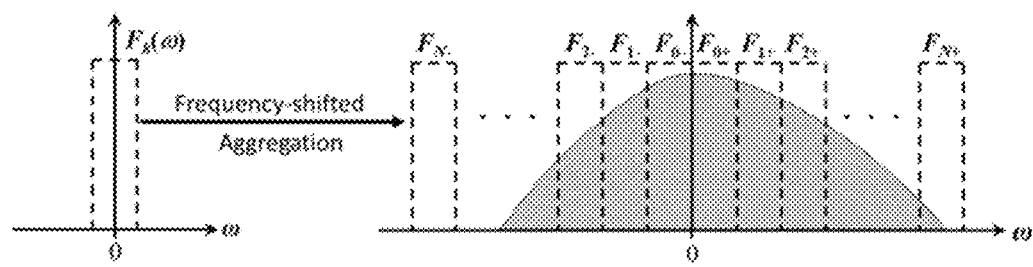
FIG. 2 is a diagrammatic illustration of a spectral resolution representation of a received signal modulated by either a transmitter or by a sensor phenomenon.

A new scheme, known as "spectral decomposition," was introduced to relax the requirement in reception bandwidth and digitization resolution by decomposing the signal in frequency domain into substantially more narrow-band spectral components. For purposes of the following description, the term "channelizing" may be used interchangeably with, and is intended to mean, "spectral decomposition" or "coherent spectral decomposition." In this usage, it is distinguishable from conventional channelization. Each component, denoted as a "channel", is subsequently detected individually. Consider such channelized representation of the modulation signal f(t), which is a frequency-shifted aggregation of its bandpass channels, each having a bandwidth of $\Delta\omega$:

$$f(t) = \sum_{k=0}^{N} f_{k+}(t)\exp\left[j\left(k-\frac{1}{2}\right)\Delta\omega t\right] + f_{k-}(t)\exp\left[-j\left(k-\frac{1}{2}\right)\Delta\omega t\right], \quad (3)$$

where $$f_{k\pm}(t) = \frac{1}{2\pi}\int_{-\infty}^{\infty} F_{k\pm}(\omega)\exp(j\omega t)d\omega = \mathfrak{F}\{F_{k\pm}(\omega)\}$$

and $\Delta\omega$ is the spectral resolution. Graphically, the operation can be illustrated as shown in FIG. 2, which diagrammatically illustrates a spectral resolution description of received signal f(t) modulated by either a transmitter or by a sensor phenomenon.

Following the above formalism, it can be seen that the detected signal at the outputs of a coherent receiver can also be expressed by the frequency-shifted aggregations of the channels. Mathematically, $$V_{Ik} = G[f_{k+}(t)+f^*_{k-}(t)]\exp(j\Delta\omega t/2)$$

$$V_{Qk} = -jG[f_{k+}(t)+f^*_{k-}(t)]\exp(j\Delta\omega t/2) \quad (4)$$

$$V_I = \sum_{k=0}^{N} V_{Ik}\exp(jk\Delta\omega t) + c.c. \quad (5)$$

$$V_Q = \sum_{k=0}^{N} V_{Qk}\exp(jk\Delta\omega t) + c.c.$$

where "c.c." denotes complex conjugate of the preceding terms. Consequently, it follows that the modulation signal can be captured with a sub-Nyquist rate acquisition system by this frequency de-multiplexing scheme. However, perfect reconstruction of the signal requires a set of brick-wall (ideally, a filter that provides very high spectral isolation, with no substantial spectral range required for a roll-off of its impulse response) filters to channelize the optical field before combining with the LO tones. Such an ideal brick-wall frequency response cannot be synthesized physically due to infinite response time and non-causality. Even a time-limited, causal approximation of a brick-wall filter could incur significant power loss and therefore sensitivity degradation.

Figure 3:
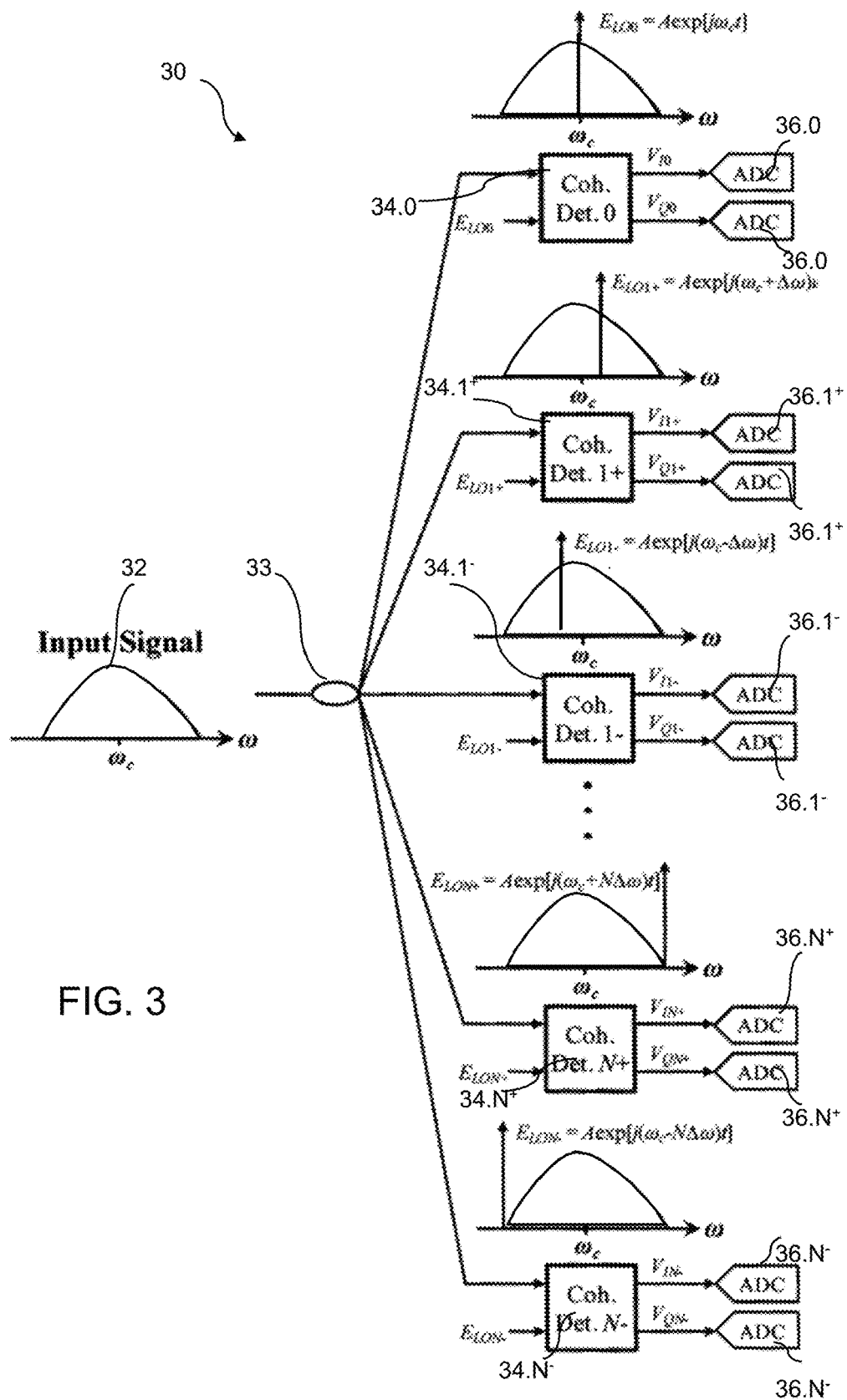
FIG. 3 is a diagrammatic view of a filterless coherent spectral decomposition.

This leads to a significant contribution of the inventive approach, which alleviates the need for a physical channelizer filter synthesis in the receiver optics. Instead of physically slicing the signal spectrum prior to coherent detection, it can be shown that the channelization can be performed a posteriori, even if the detector and ADC bandwidths cannot accommodate the entire signal spectrum. The schematics for this filterless channelized receiver 30 are shown in FIG. 3, in which each port or backplane subrate coherent detector is fed by the signal copy from the signal comb and by a frequency-matched local oscillator (LO) tone from the coherently coupled comb.

In this scheme, the input signal 32 is split achromatically by power splitter 33 and mixed with a set of LOs (not shown in this figure). The LOs span a discrete frequency space of [$-N\Delta\omega$, $N\Delta\omega$] with spacing equal to $\Delta\omega$. The detector electronics 34.0-34.N$^-$ and the analog front-end of the ADCs 36-0 to 36-N$^-$ perform soft-filtering (low-pass filtering with relatively slow roll-off) to avoid aliasing in analog-to-digital conversion, whereas the digital signal processing back-end in the ADCs applies brick-wall filter with a bandwidth of $\Delta\omega$ on the signals acquired. Following the same formalism as in previous discussions, the resultant signals can be found as:

$$V_{I0} = G[f_{0+}(t)+f^*_{0-}(t)]\exp(j\Delta\omega t/2)+c.c$$

$$V_{Q0} = -jG[f_{0+}(t)-f^*_{0-}(t)]\exp(j\Delta\omega t/2)+c.c \quad (6)$$

$$V_{Ik-} = G[f_{k+}(t)+f^*_{(k-1)+}(t)]\exp(j\Delta\omega t/2)+c.c$$

$$V_{Qk-} = -jG[f_{k+}(t)-f^*_{(k-1)-}(t)]\exp(j\Delta\omega t/2)+c.c \quad (7)$$

$$V_{Ik-} = G[f_{(k-1)-}(t)+f^*_{k-}(t)]\exp(j\Delta\omega t/2)+c.c$$

$$V_{Qk-} = -jG[f_{(k-1)-}(t)+f^*_{k-}(t)]\exp(j\Delta\omega t/2)+c.c \quad (8)$$

where $V_{I/Qm}$ correspond to the coherent detection signal generated with LO frequency equal to $m\Delta\omega$, and other notations follow those of Equations (3)-(5). While the outputs from coherent detector 0 ($V_{I0}$ and $V_{Q0}$) resemble the same outputs given in Equations (4) and (5), outputs from other detectors (e.g., k+) are corrupted by image channels ($f_{(k-1)+}(t)$). Observing that:

$$V_{Ik+} + V_{Ik-} = G\{[f_{k-}(t) + f^*_{k-}(t)] + [f^*_{(k-1)-}(t) + f_{(k-1)-}(t)]\}\exp(j\Delta\omega t/2) + c.c. \quad (9)$$
$$= V_{Ik} + G[f^*_{(k-1)-}(t) + f_{(k-1)-}(t)]\exp(j\Delta\omega t/2) + c.c.$$

$$V_{Ik+} - V_{Ik-} = G\{[f_{k-}(t) - f_{k-}^*(t)] + [f_{(k-1)-}^*(t) - f_{(k-1)-}(t)]\}\exp(j\Delta\omega t/2) + c.c. \quad (10)$$
$$= jV_{Qk} + G[f_{(k-1)-}^*(t) - f_{(k-1)-}(t)]\exp(j\Delta\omega t/2) + c.c.$$

and that the second terms in Equations (9) and (10) are merely the conjugate of $V_{Ik}$ and $V_{Qk}$ in Equations (4) and (5) followed by a frequency shift of $\Delta\omega$, the image channels can therefore be canceled using the following image rejection algorithm:

```
I_0 = V_{I0}; Q_0 = V_{Q0};
for k = 1 to N
    I_h = H{I_{k-1}}; Q_h = H{Q_{k-1}}; /*H{x} = Hilbert transform of time
    series x.*/
    image_I = I_{k-1}*cos(Δωt) + I_h*sin(Δωt);
    image_Q = Q_{k-1}*cos(Δωt) + Q_h*sin(Δωt);
    I_k = V_{Ik+} + V_{Ik-} - image_I;
    Q_k = V_{Ik+} + V_{Ik-} - image_Q;
end
```

Note that the quadrature-phase outputs of the coherent detectors are not used except for the zero-shift channel, since the quadrature-phase information is already retrieved from the negative frequency-shift channels. Therefore, the filterless channelizer scheme requires the same number of ADCs as in the filtered channelizer realization. In a special case when f(t) is real, the Hermitian property of its spectrum $F(\omega)$ can be utilized to simplify the channelizer construction. Since $F(-\omega)=F^*(\omega)$, the signal can be reconstructed by acquiring only the positive (or negative) portion of the frequency spectrum, and only in-phase outputs of the coherent detectors are needed. The image rejection algorithm for this special case is:

```
I_0 = V_{I0}/2;
for k = 1 to N
    I_h = H{I_{k-1}}; /*H{x} = Hilbert transform of time series x.*/
    image_I = I_{k-1}*cos(Δωt) + I_h*sin(Δωt);
    I_k = V_{Ik+} - image_I;
end
```

For both cases, as well as in the filtered channelizer scheme, the actual reconstruction of coherent detection signals $V_I$ and $V_Q$ requires the following frequency-domain stitching steps:

```
V_I = 0; V_Q = 0;
for k = 0 to N
    I_k_h = H{I_k};
    V_I = V_I + I_k*cos(kΔωt) - I_k_h* sin(kΔωt);
    if (complex_f)           /*if f(t) is complex... */
        Q_k_h = H{Q_k};
        V_Q = V_Q + Q_k*cos(kΔωt) - Q_k_h* sin(kΔωt);
    end
end
```

Figure 4:
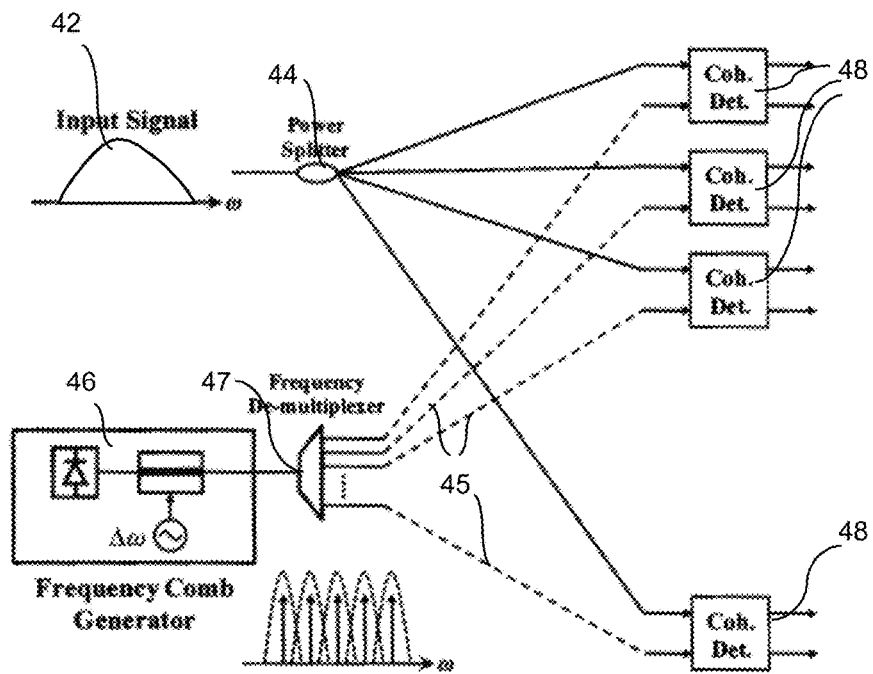
FIG. 4 diagrammatically illustrates passive realization of a coherent spectral decomposition.

In practice, realization of a filterless spectral decomposition requires pristine replication of the input signal and generation of low-noise LO tones. Referring to FIG. 4, in a simplistic manner, signal replication can be achieved by passive power splitting input signal 42 at splitter 44, while LO tones 45 can be generated using well-established frequency comb generation techniques (for instance, phase modulating a low phase-noise laser output by a pre-set RF tone via frequency comb generator 46) followed by a frequency demultiplexer 47 to fan-out individual LO tones 45 to their respective coherent detectors 48. Typically, each coherent detector will have a response bandwidth that is much smaller than the bandwidth of the input signal.

Instead of splitting the signal passively, active two-pump parametric mixers 50 can serve both the functions of signal replication and LO generation. In one embodiment of the invention, the use of an optical frequency comb provides a straightforward approach to implement the architecture shown in FIG. 4. Specifically, it is possible to use a parametrically generated optical comb to generate DFT of either optical or wireless (radio-frequency) signal. Physically, these are nonlinear parametric mixers that may be realized in silica, silicon, or other optically nonlinear material waveguide.

The inventive mutually-coherent frequency combs can be implemented employing a number of different architectures and variables. For example, the frequency combs may be generated in mixers that are seeded by a single master laser emitter or by multiple laser emitters where the multiple laser emitters are mutually coherent. When multiple lasers are used, coherence may be achieved by injection locking of a slave laser emitter, or by providing feedback to each emitter from a common optical or radio-frequency reference. The frequency pitch difference can be freely selected and adjusted.

The input signals may be in the optical domain and may have a frequency content higher than 1 THz, or may be in the radio-frequency domain with a frequency content below 1 THz.

Figure 5:
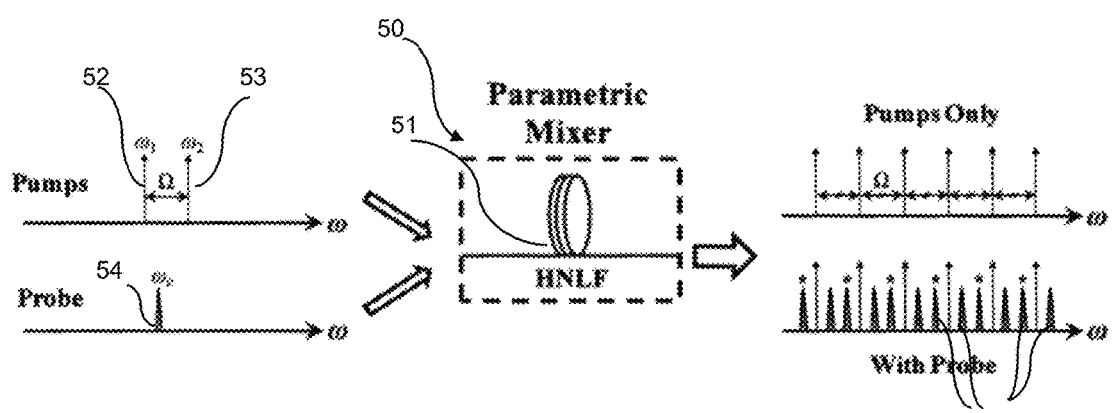
FIG. 5 diagrammatically illustrates the operating principle of a comb generation by two-pump parametric, traveling-wave (cavity-less) mixer.

An exemplary approach to implementing a two-pump parametric mixer is shown in FIG. 5. In this embodiment, the core of the mixers is a section of highly-nonlinear fiber (HNLF) 51, which possesses large nonlinear coefficient and low chromatic dispersion to enable efficient photon mixing. Highly nonlinear fiber (HNLF) can be replaced by silicon waveguide or any other nonlinear waveguide possessing sufficiently high nonlinear refractive index and sufficiently low optical loss.

When a mixer 50 is pumped by two intense pump waves 52, 53 with optical frequencies $\omega_1$ and $\omega_2$, parametric interaction between the pumps will result in optical harmonics generation. Due to conservation of photon energy in parametric processes, the frequency spacing of the harmonics is bounded to be the difference frequency of the pumps, i.e., $\Omega=\omega_2-\omega_1$. In the presence of a probe wave 54 (cot) in spectral proximity to the pumps, interaction between the pumps and the probe generates a pair of sidebands 55 symmetric to each pump, where the sidebands 55 carry the same (or conjugated) modulation of the probe. Concurrently, the sideband-generation process on the original pumps are transferred to the pump harmonics, which gives rise to creation of two signal copies per pump harmonics generated. As a result, the input probe is replicated extensively in a frequency non-degenerated manner.

Figure 6A:
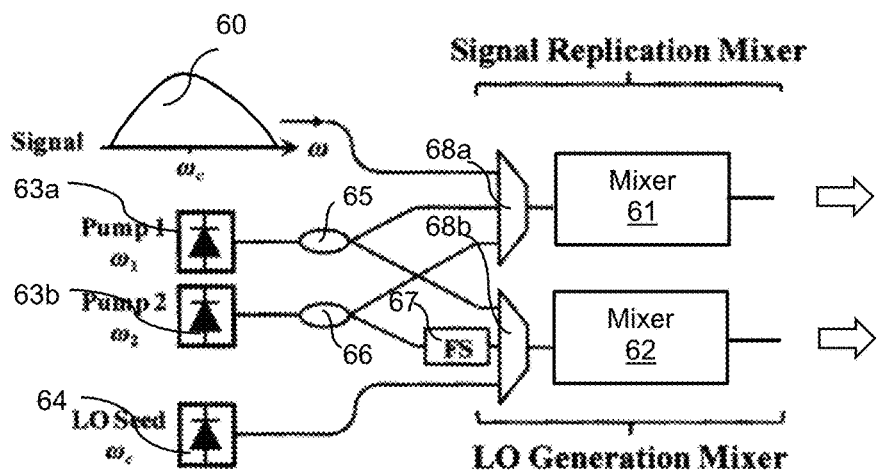
FIG. 6A is a diagram showing the use of an optical frequency comb when the input signal is in the optical domain.

Utilizing the replication feature of two-pump parametric mixers, a parametric-mixer-aided coherent channelizer scheme is devised, as shown in FIG. 6A, which illustrates an implementation of the optical frequency comb for an input signal in the optical domain. The construction comprises two parametric mixers 61, 62 providing signal replication and LO generation, respectively. Signal copies are generated by launching the input optical signal 60 into the signal replication mixer 61, whereas the LO tones are created by seeding the LO generation mixer 62 with a laser line (LO seed) 64 coinciding to the (mean) signal frequency $\omega_c$. The signals are split at splitters 65 and 66 and fed into mixers 61, 62 via multiplexers 68a and 68b. For both mixers, the pumps 63a and 63b are provided by the same pump laser sources, except that one of the pumps (pump 63b) of the LO generation mixer 62 is frequency shifted (by optical frequency shifter 67) by $\Delta\omega$. In cases where a high mutual comb coherency is required, pumps 63a and 63b and LO seed 64 can be derived from a single master laser to maintain mutual coherency.

Figure 6B:
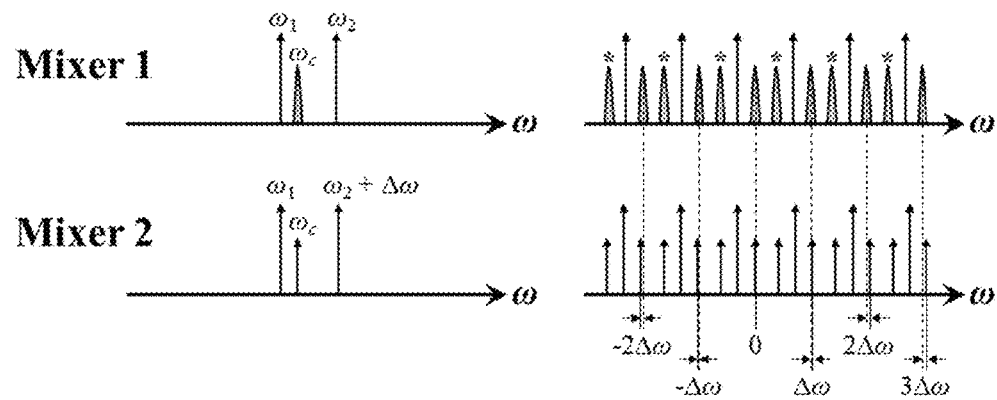
FIG. 6B illustrates examples of sidebands generated by mixers according to an embodiment of the invention.

Referring to FIG. 6B, signal replication mixer 61 (designated in the figure as "Mixer 1") produces sidebands as described above with reference to FIG. 5, where interaction between the pumps and the probe generates a pair of sidebands symmetric to each pump. Sidebands marked by asterisks represent conjugated sidebands.

With the LO generation mixer 62 (designated in FIG. 6B as "Mixer 2") driven in this manner, the non-conjugated sidebands will assume spectral positions as $\omega_c + k(\Omega + \Delta\omega)$ instead of $\omega_c + k\Omega$ in the signal mixer. Thus, the LO tones generated will have the required frequency offsets of $\{k\Delta\omega\}$ relative to the signal copies. The advantage of this parametric-mixer-aided approach is that the frequency spacing of the LO tones can be arbitrarily wide, without being restricted by the detector bandwidth $\Delta\omega$. This characteristic vastly relaxes the finesse requirement of the frequency de-multiplexing filters, meaning that the fan-out can be achieved with low-cost telecom-grade components. Furthermore, the decoupling of LO tone spacing from the bandwidth of the detection electronics and the elimination of narrow-band filtering implies that a single optical front-end construction can be adapted to different detection back-end, thus providing further flexibility in cost-performance consideration.

Figure 6C:
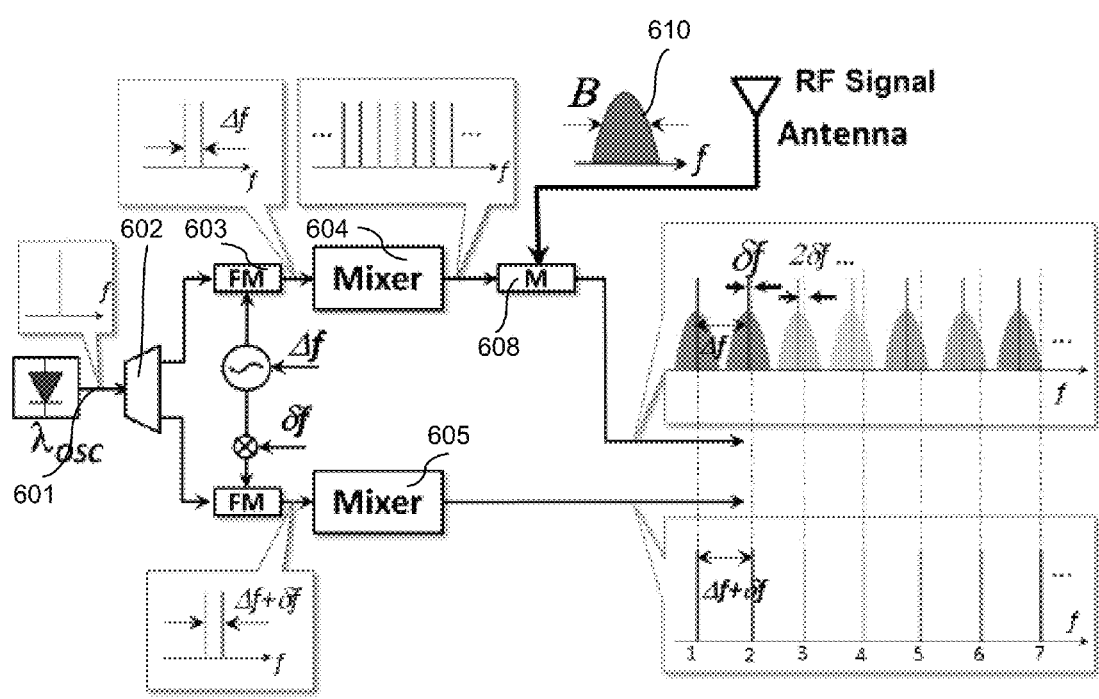
FIG. 6C is a diagram showing use of the optical frequency comb when the input signal is in the RF domain.

Using the inventive optical frequency comb, one can create general architecture that can be applied for generation of either DFT, DHT, or other transforms, for different types of input signals. In other words, the inventive approach is not limited to processing of input signals only in the optical domain. An exemplary implementation of an optical comb when the input signal is in the RF domain is shown in FIG. 6C, where all seed waves used to generate comb in mixer are derived from a single master oscillator. An optical seed signal 601 is multiplexed at multiplexer 602, modulated at frequency modulator 603 and fed into signal replication mixer 604 to replicate it into N spectral copies separated by $\Delta f_1$ ($\Delta f_1 > B$). The spectral clones from mixer 604 are then modulated by the RF input signal 610 at modulator 608. Separately, the reference comb 605 (also referred to as a LO comb) generates N carriers (frequency tones) separated by $\Delta f_2$. A frequency pitch of the reference comb 605 is specifically chosen to satisfy $\Delta f_2 - \Delta f_1 = \delta f$, where $\delta f$ is defined by DFT temporal window $\delta f = 1/T$. Finally, at the receiver backplane (not shown), the phase of all spectral clones and all reference tones must be strictly correlated. This critically important requirement guarantees the ability to coherently mix each copy-reference pair. Indeed, if the k-th spectral clone and the k-th reference tone are received by a slow coherent receiver ($R_k$, with bandwidth $\delta f$), the resulting beating will generate both quadratures of the k-th DFT coefficient ($f_k$). While the receiver backplane operates in continuous mode, a DFT coefficient array ($\vec{f}$) can be outputted by subrate clock $T = 1/\delta f$. When signal bandwidth is changed dynamically, it can be easily matched by changing the frequency pitch of the signal or LO combs. In a simple implementation, it is sufficient to change the frequency generator $\delta f$ controlling the difference between two combs.

As an illustration, assume that a 256-long DFT of 100 GHz-bandwidth waveform needs to be generated. To accomplish this, the input must be cloned onto 256 spectral copies, occupying the total bandwidth of 100 GHz×256=25.6 THz, or approximately 150 nm. This also means that arrayed receiver element must possess the bandwidth 100 GHz/256~400 MHz, well within the means of current CMOS integration scaling.

Figure 7:
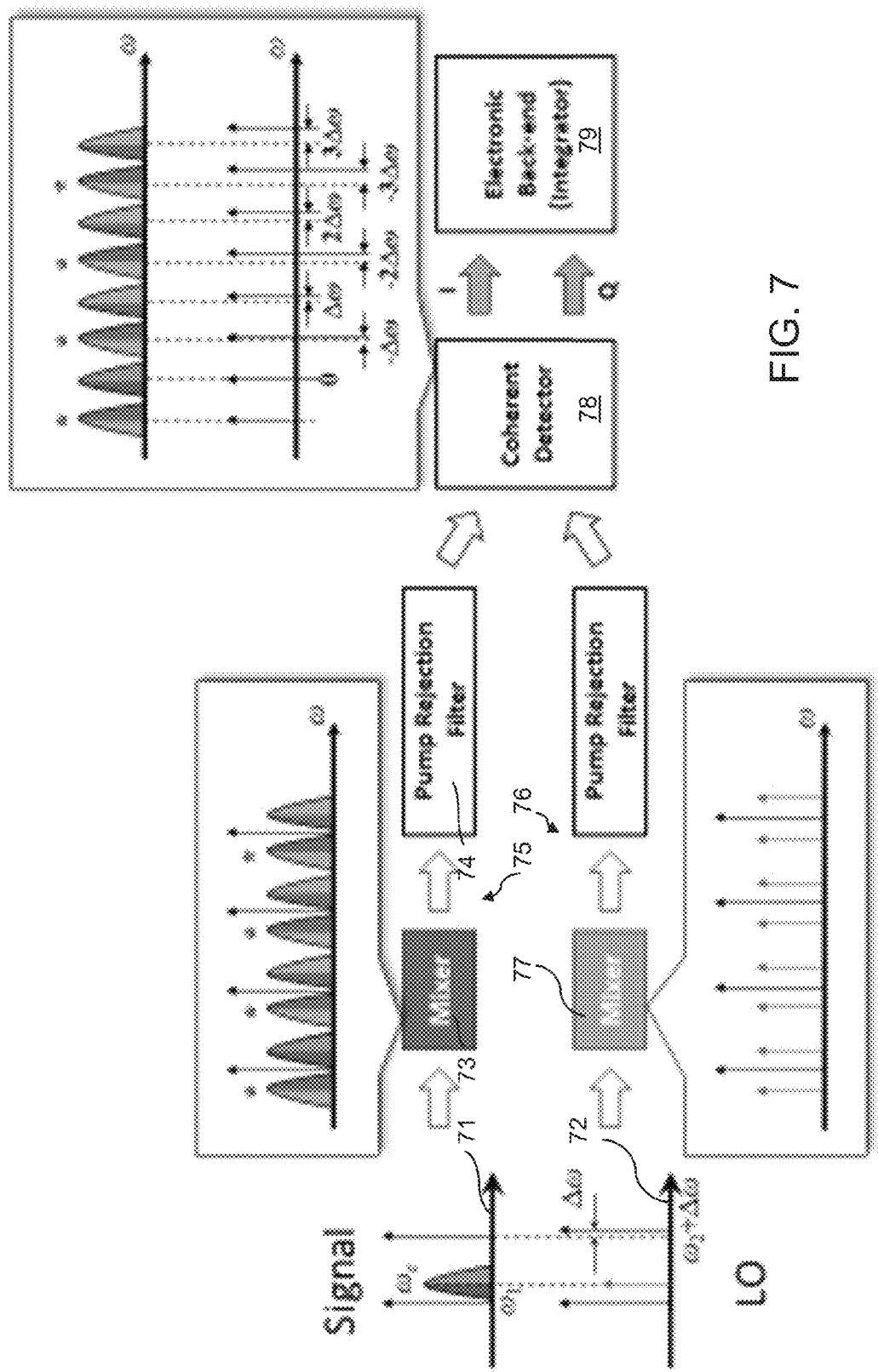
FIG. 7 shows a generalized filterless DFT processor topology where signal and LO waves that seed mixers are mutually coherent and the signal is in optical domain.

FIG. 7 illustrates the core experimental topology based on filterless, format-transparent, rate-variable preprocessor. The target channel is combined with two continuous-wave (CW) beams 71, 72 and launched into multicasting mixer 73 to generate multiple copies separated by separation defined by pump-pump seeds. The mixer 73 generates not only additional channel copies but also produces secondary (CW) pump tones—the pump rejection filter 74 passes only channel multicast image, as shown in the upper arm 75 of the topology in FIG. 7. A separate CW pump-seed pair is used to generate local oscillator (LO) array 76 in the lower arm of the processor. The LO must be strictly locked (in phase) to the multicast wave and be precisely positioned relative to each newly generated channel copy. Specifically, the first LO tone is centered with respect to the original channel; incremental LO order is shifted by $\Delta\omega$ with respect to the multicast replica. The frequency offset ($\Delta\omega$) is strictly controlled by a single CW-wave ($w_2 + \Delta\omega$) at the input of the LO mixer 77.

Coherent detector 78, which shown as a single block, but is actually is a bank of coherent detectors corresponding to the different channels (tones) receives the channel copies for input into electronic back-end 79 for integration.

While this implementation uses two physical mixers (73, 77), nothing prevents a derivative in which a single mixer serves to generate both multicast and LO complement by counterpropagating parametric interaction.

A precise frequency offset between all LO and channel replicas is only a necessary but not sufficient condition if a coherently modulated data must be acquired. Indeed, both mixing processes are seeded by a pair of CW waves and the original channel. If phase evolution of these waves is independent (carrier phases are uncorrelated), the retrieval of phase-encoded information requires fast post-processing (phase-tracking) similar to that in the commercial high-rate receivers. While in principle possible, this approach would also eliminate the key advantage of all-optical DFT: low dissipation and latency.

Figure 8:
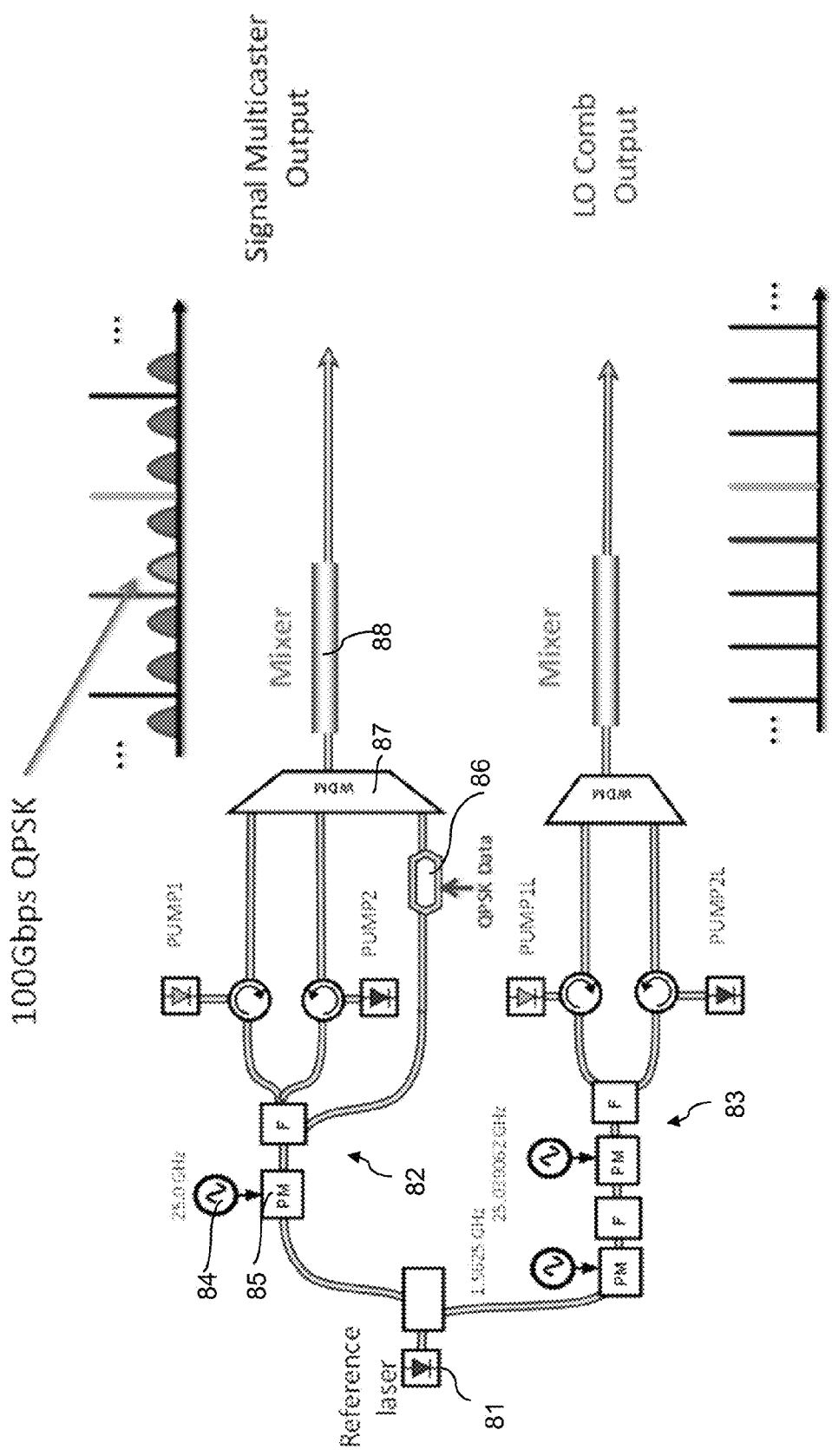
FIG. 8 shows an embodiment of a self-referenced DFT processor architecture that relies on a single master oscillator.

The topology shown in FIG. 8 illustrates how high-speed electrical channels can be analyzed by the same DFT architecture: all participating channels are derived from a single (reference) source, guaranteeing the strict phase correlation within the entire preprocessing layer. A reference laser 81 is a weak (~10 mW), highly coherent source (~kHz linewidth) and is divided into multicasting (upper) 82 and LO-generating (lower) arm 83. The channel copy spacing is controlled by an RF oscillator 84 that modulates seed phase modulator (PM) 85. In upper arm 82, signal is phase modulated with QPSK data at 86 prior to multiplexing at WDM 87 and generation of channel copies in signal replication mixer 88.

Figure 9:
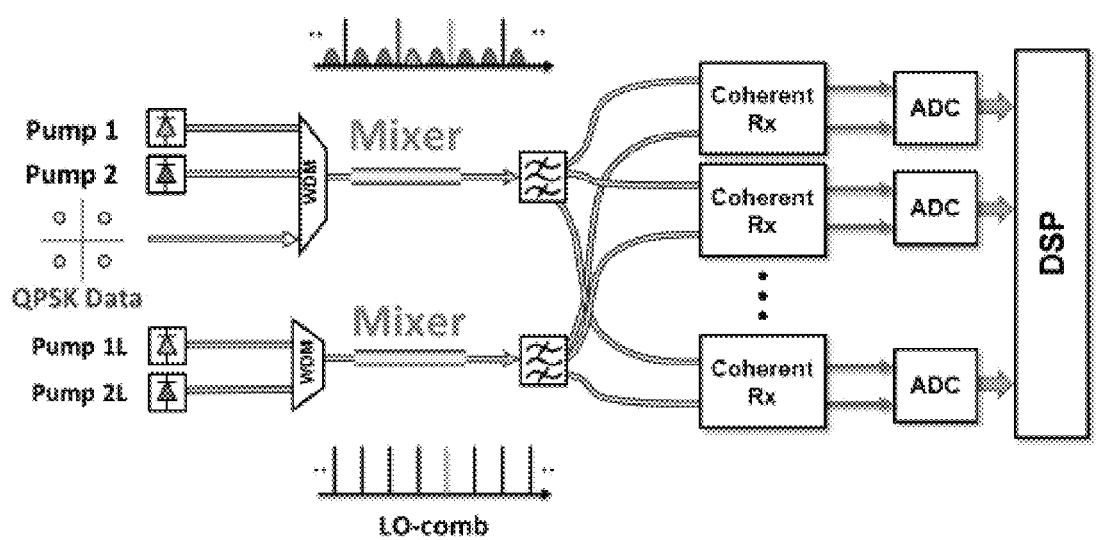
FIG. 9 diagrammatically illustrates an exemplary DFT processor implementation.

FIG. 9 illustrates processor architecture that was downselected for the demonstration. Since 100 Gbps corresponds to 50 Gbaud (physical) channel, the existence of sixteen (16) physical copies requires that coherent backplane processes at 3.125 GHz (50 GHz/16) rate. In contrast, a conventional (end-of-link) receiver must have 50 GHz bandwidth and be concatenated by the electronic backplane operating at the same rate. Even if one considers a digitizer alone, the benefit, in terms of practical resolution, are obvious: while 50 Gsa/s can be presently achieved with approximately 5-ENOB resolution, an ADC operation derated to ~3 GHz easily exceeds 9-ENOB level.

Figure 10:
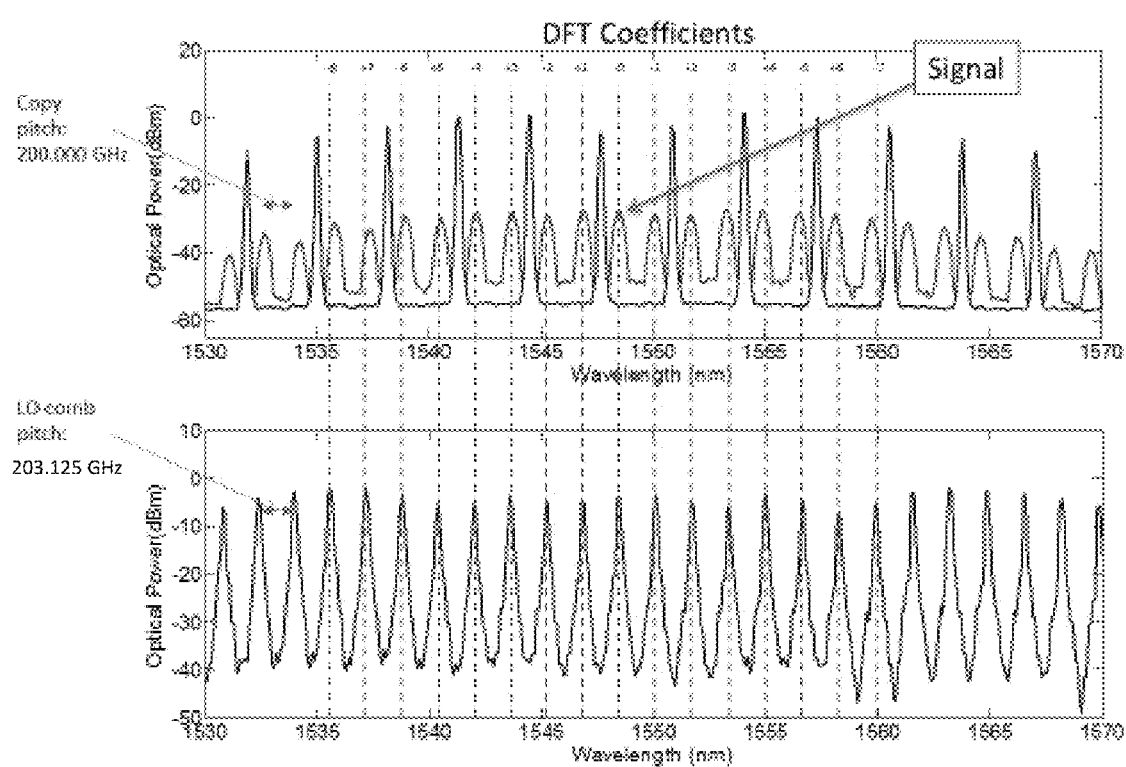
FIG. 10 shows measured channel replication (top panel) and LO-array spectra (bottom panel) for the purpose of generating DFT of the optical signal.

FIG. 10 shows all 16 channel copies generated simultaneously with a frequency-locked LO-array. The channel copies were generated on 200 GHz-pitched grid (upper panel); the LO-array (lower panel) was offset by channel sub-band (50 GHz/16) and was created over a 203.125 GHz-pitched comb. The zero-offset channel-LO pair was selected at the center of the band (1548.5 nm). No particular effort was made to equalize either channel copies or LO tones as they were more than sufficient to drive a coherent receiver. However, in a dissipation-optimized processor, the equalization procedure is seen as important since it guarantees that no excess photon conversion occurs.

Figure 11:
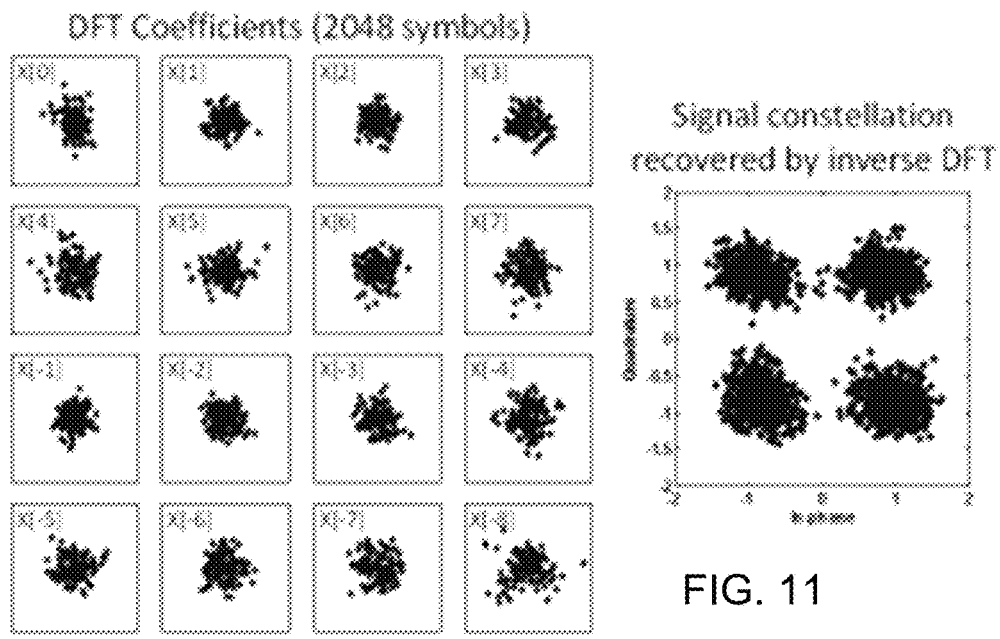
FIG. 11 shows real-time acquisition of DFT complex coefficients according to embodiments of the invention (left panel) based on the same measurements shown in FIG. 10. The right panel demonstrates that IDFT of acquired coefficients reassembles the original Quadrature Phase Shift Keying (QPSK) constellation.

Based on the same measurements shown in FIG. 10, acquired copy/LO streams were acquired and are displayed in raw form. The left panel of FIG. 11 shows real-time acquisition of DFT complex coefficients. The right panel demonstrates that IDFT of acquired coefficients reassembles the original Quadrature Phase Shift Keying (QPSK) constellation. Each pixel in the I/Q plane corresponds to a single bit (DFT coefficient): component notation (e.g. X[3]) indicates the physical copy count. A total of 32 (16 I and 16 Q components) are streamed continuously by the processor. It is important to note that any change at the input can be automatically tracked. Indeed, one can assume that the channel rate is increased by seven percent (7%) to accommodate any traffic overhead. The present topology is trivially modified to meet this change by simply reconfiguring the 3.125 GHz offset between the channel replication grid (200 GHz) and LO-generating grid (203.125 GHz) to the new 3.34375 GHz value (50 GHz/16). In practice, this means that one only needs to tune an RF oscillator in the lower arm of the frequency-locked construct shown in FIG. 10.

Figure 12:
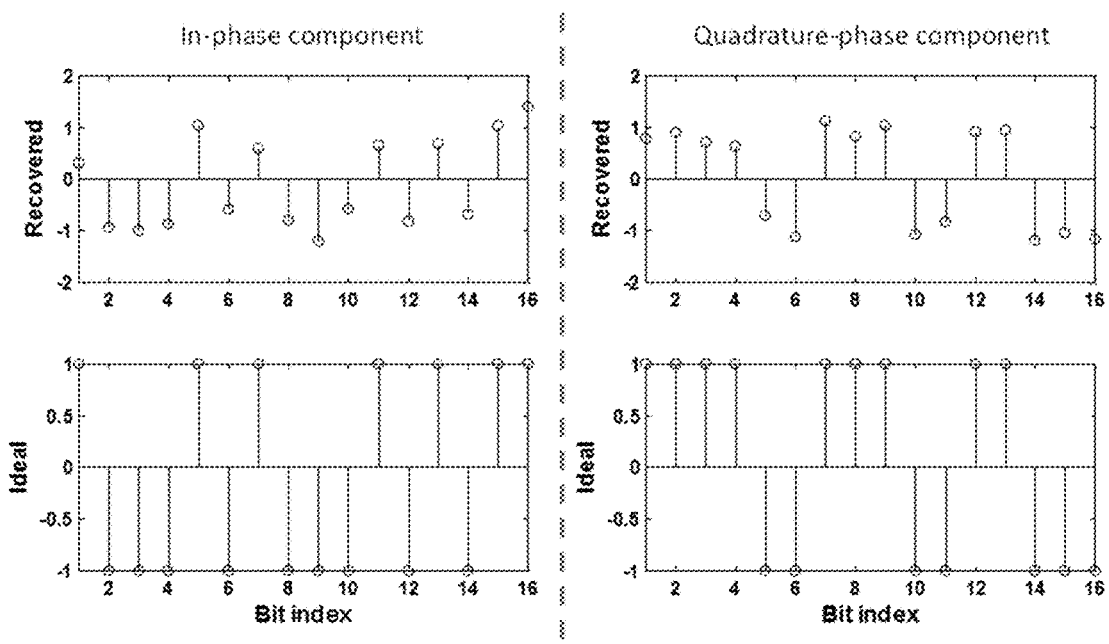
FIG. 12 provides a comparison between ideal (bottom) and measured (top) DFT coefficients acquired from 100 Gbps QPSK Channel, indicating that a simple thresholding will recover encoded bit levels.

In FIG. 12, we plot acquired DFT coefficients and compare them to an ideal reception (noiseless reception with unlimited Rx bandwidth). This provides a comparison between ideal (bottom) and measured (top) DFT coefficients acquired from 100 Gbps QPSK Channel, indicating that a simple thresholding will recover encoded bit levels. We note that all received DFT coefficients are accurately recognized (no sign reversal occurred during the entire sequence). More importantly, if a simple, threshold-based decision is imposed on recovered sequence, the DFT stream would be error free. The deviation from the ideal (computed) DFT decomposition was attributed primarily to an imperfect (Quadrature Phase Shift Keying (QPSK) channel generation; we observed no measurable penalty from the channel replication and LO-tone generation process. The recovered decomposition was stable and repeatable during the entire demonstration session.

Figure 13:
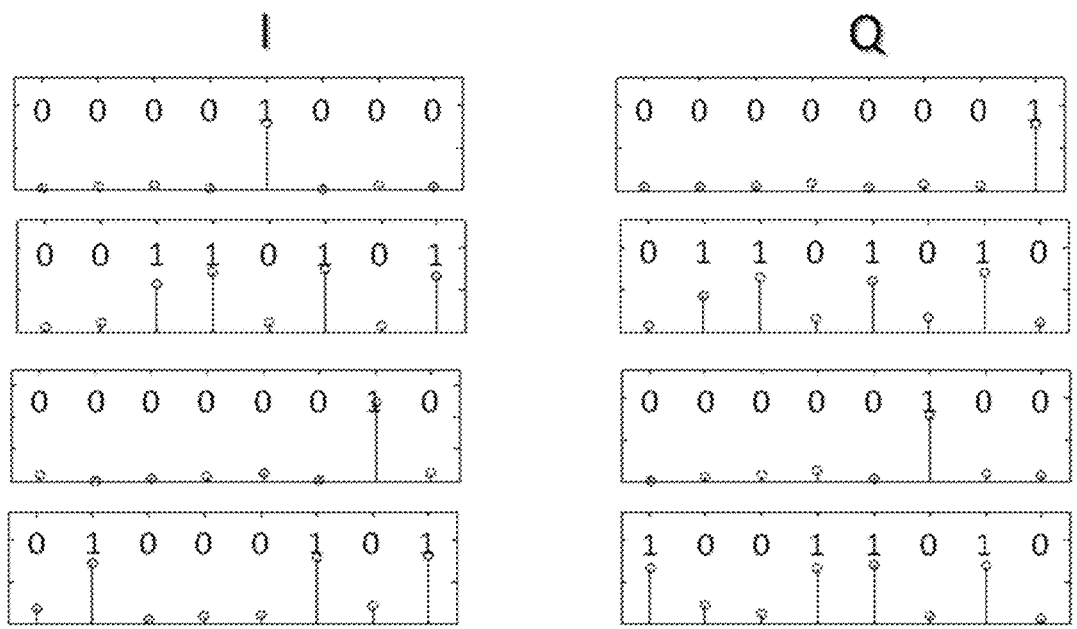
FIG. 13 provides a comparison with programmed and acquired 100 Gbps QPSK bit sequence.

To prove that DFT-based recognition of a coherent channel is equivalent to temporal (bit-sequence) correlation, we transform the captured DFT sequence to temporal domain by computing inverse FFT. The results are shown in FIG. 13, demonstrating: a) full equivalency between DFT and serial (temporal) correlation performed on coherent channel; and b) error-free recovery, even in the case when simplest (single-threshold) decision must be taken.

The approach described herein provides means for channelizing a wide-band, high-speed optical signal, or an electrical signal via electrical/optical conversion, through coherent detection, without the need for narrow-band optical filtering to perform frequency slicing. This new class of coprocessor relies on coherently coupled, optical frequency combs, which, in addition to providing an inherent femtosecond response, decouple the practical processing rate from scalability and dissipation metrics.

The foregoing describes a new class of hybrid (photonics-assisted) architecture capable of general signal transform operation by a physical preprocessor. Specifically, the approach provides for physically-assisted generation of discrete Fourier transform (DFT), discrete Hilbert transform (DHT), or other transform of an input signal that resides in either the photonics or wireless (radio-frequency) domain. The inventive approach allows such processors to be implemented for use in many disciplines ranging from electronic warfare (EW), cyber-security, optical and wireless communications, image processing and spectroscopy.

The following sections present a few examples of DFT applications that benefit from the physically-assisted processor described herein, taking them beyond the limitations imposed by conventional electronics technology. Based on the disclosure herein, it will be readily apparent to those in the art that other applications will similarly benefit from the inventive approach.

Example 1: Ultrawideband (UWB) Secure Wireless Communication

In the example of ordinary (single-carrier) PPM demodulation, the frequency phase slope should be measured to estimate the received pulse position. Consequently, the resolution of the frequency decomposition should be sufficient to provide accurate pulse position estimation: the resolution in this case is directly proportional to the number of frequency comb tones used. Correspondingly, a wideband optical frequency comb with high tone count is superior but imposes distinct implementation challenges. Recognizing this, conventional comb generation techniques such as E/O-generated combs, resonator-seeded combs and mode-locked laser combs impose either limited tone count or prevent frequency reconfigurability. On the other hand, with the advent of shock wave and comparable performance parametric mixers with hundreds of optical comb tone counts readily achievable, and frequency pitch reconfigurability, such mixers are desirable for their use in a comb based FH-PPM receiver. Accordingly, those of skill in the art will recognize that the mixers used in this example are part of an illustration of embodiments of the invention, and that other types of mixers may be employed with the same or similar results.

In the exemplary implementation, a comb-assisted receiver operates in FH-PPM mode. Specifically, an 80 Mbps PPM signal was imposed on randomly hopping frequency carrier that ranged from 1.6 GHz to 4.16 GHz and subsequently captured and demodulated. The FH-PPM signal is captured using 256 tones from two mutually coherent optical frequency combs with a pitch of 25 GHz and 24.92 GHz. A set of 16 tones was simultaneously captured by a single coherent detector, and processed by electronic backplane. The backplane consisted out of 16 coherent receivers, allowing for a direct monitoring of 20.48 GHz RF bandwidth, with a frequency resolution of 80 MHz.

Figure 14:
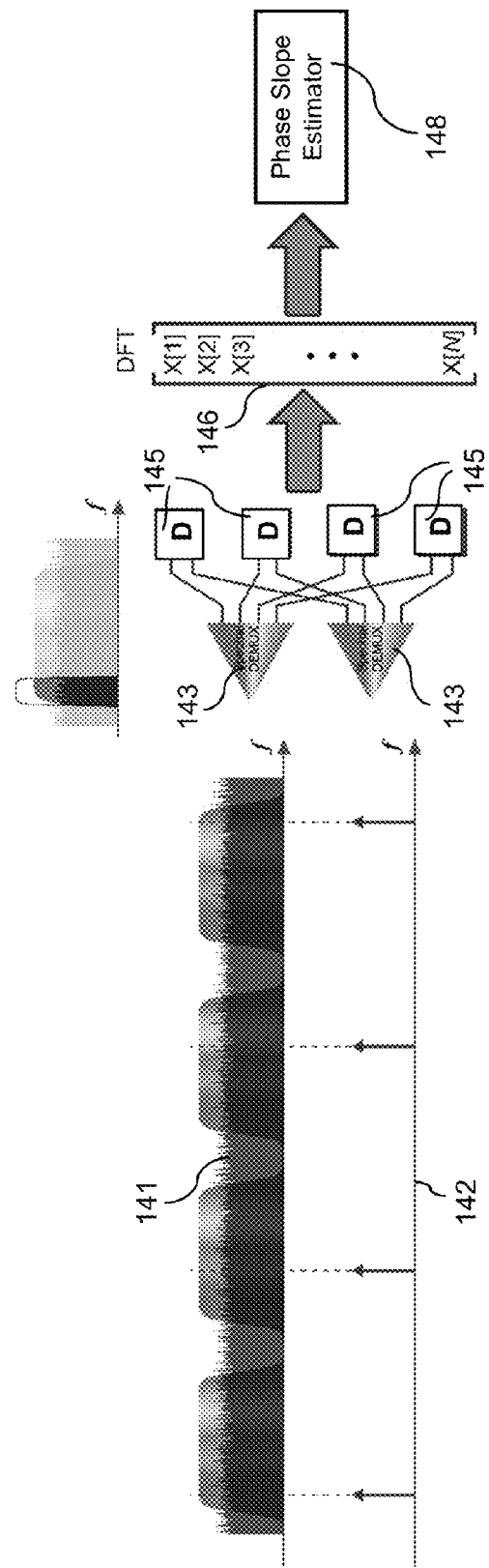
FIG. 14 is a diagrammatic view of a comb-assisted FH-PPM receiver according to an embodiment of the invention.

The principle of the PPM receiver relies on three unique attributes: low-noise and low-distortion coherent signal replication, filterless frequency decomposition, and a single-step phase estimation. A simple overview of the principle is shown in FIG. 14. Ideally, the received FH-PPM signal is replicated in a noise- and distortion-free manner by modulating an optical frequency comb, pitched at ΔF. Effectively, the electrical signal field 141 (rather than its spectral power) is replicated onto each of the N modes (carriers) of the comb. The filterless frequency decomposition is achieved by generating a second reference optical frequency comb 142 with a precise frequency pitch offset by δf with respect to the signal comb. Next, the optical modes are then separated with a spectral demultiplexer 143, and overlapping tones sent to a coherent detector element 145. This allows for the reference comb tone to beat with a specific portion of the FH-PPM spectrum and down-convert its immediate spectral vicinity. In essence, each of the sub-band frequency slices of the original RF spectrum are addressed by a self-referenced local oscillator (LO) modes. As a result, only low-speed coherent detector and sub-rate electrical digitizers are sufficient to synthesize bandpass frequency filter, rejecting the signal content that is too distant from the selected signal frequency slice of the received signal.

Next, the decomposed spectrum is sent to low speed electrical digitizers 146. In effect, these stream the measured discrete Fourier transform (DFT) coefficients of the FH-PPM RF signal without any additional computation step. Finally, the phase is extracted from each of the DFT coefficients, and a linear phase slope estimator 148 is used to decode the position of each transmitted pulse.

Figure 15:
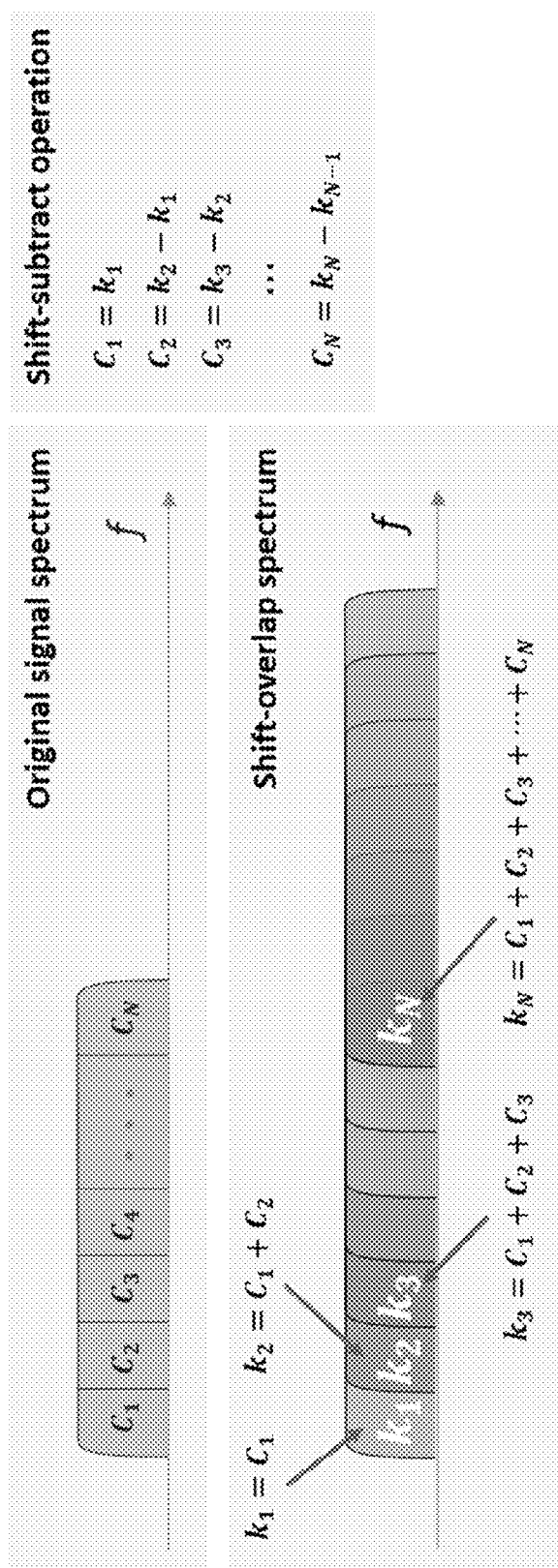
FIG. 15 diagrammatically illustrates one possible coherent detector implementation based on a frequency shift-and-subtract algorithm.

In a simple implementation, the architecture calls for a complement of coherent detectors that matches comb tone count. This allows the DFT coefficients to be derived concurrently. To stream hundreds of DFT coefficients simultaneously, it appears that a significant hardware burden must be accepted, since a large number of receivers and digitizers would need to be employed. However, each receiver-digitizer element operates at relatively low speed compared to the overall FH-PPM bandwidth, allowing for a full bank of low-dissipation architecture to be monolithically integrated. Alternatively, multiple DFT coefficients can be processed by a single, faster receiver-digitizer element using a recursive algorithm that requires knowledge of the first spectral decomposition bin. Specifically, a wideband spectral demultiplexer is implemented, simultaneously selecting multiple frequency tones from each of the optical frequency combs received by a coherent detector, the input electrical spectrum will be shifted M times in frequency by the frequency comb pitch difference and repeatedly added to itself. An exemplary frequency shift and subtract algorithm for this purpose is illustrated in FIG. 15. To extract each of these M DFT coefficients, a digitizer must have sampling bandwidth of Mδf, with M<<N. In the digital signal processing (DSP) domain, a shift and subtract operation could be utilized to extract each of the M DFT coefficients, while still not requiring a strict, optical filtering layer. As will be readily apparent to those of skill in the art, this implementation is exemplary only and other receiver architectures may be used with the same or similar results.

Figure 16A:
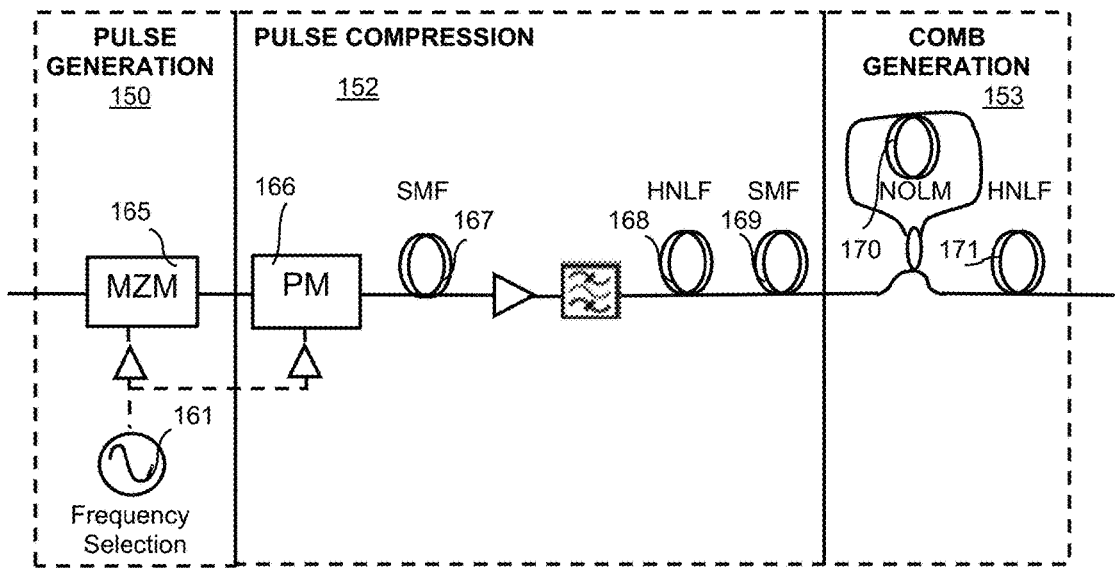
FIG. 16A shows an exemplary implementation of a tunable optical comb generator.

The receiver architecture relies on the generation of two high fidelity, frequency locked optical frequency combs, each with high power per generated tone, frequency stability, frequency reconfigurability, and spectral purity. FIG. 16A illustrates the construction of an exemplary comb generator based on a highly non-linear fiber (HNLF). This example is provided as one possible frequency comb architecture that could be used to implement the mutually coherent combs for physically-assisted computation of a transform according to the invention. Accordingly, this example is not intended to be limiting, and it will be apparent to those in the art that other comb architectures may be used to achieve the mutually coherent behavior that lies at the heart of the invention.

Figure 16B:
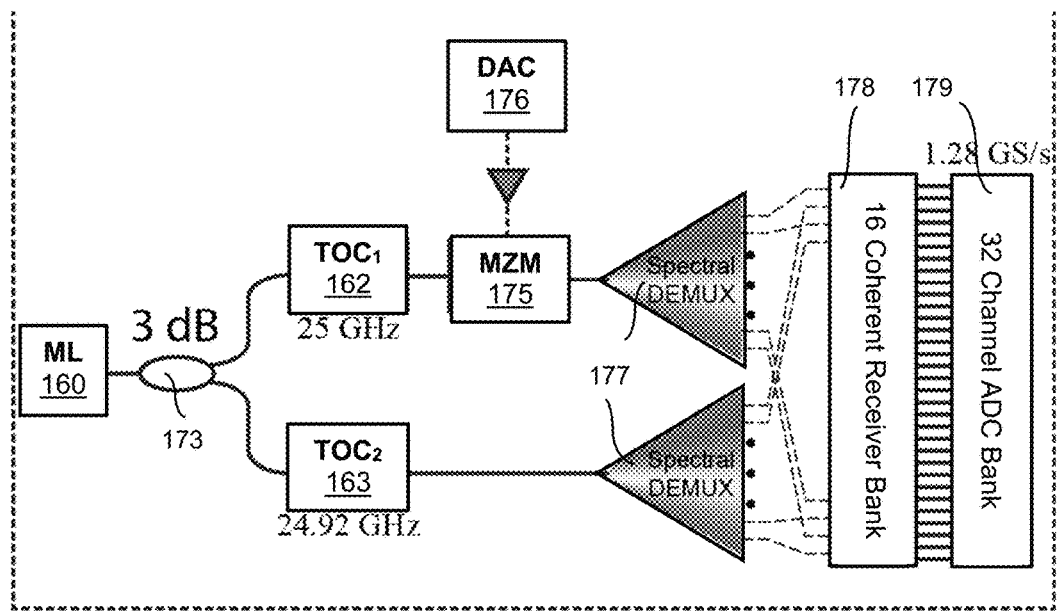
FIG. 16B is a diagram of an experimental setup of a receiver incorporating a mutually-coherent frequency comb.
Figure 17:
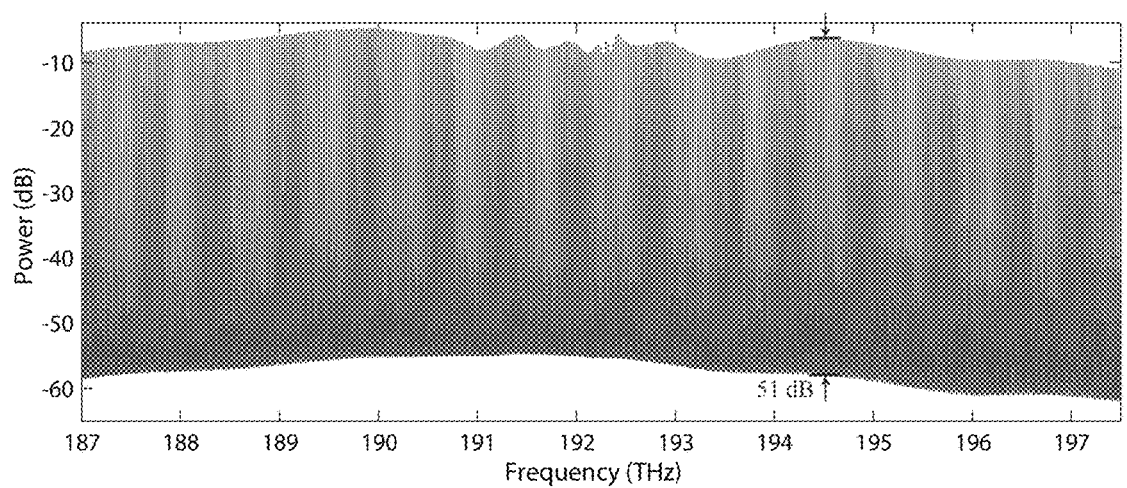
FIG. 17 shows the results for a generated 25 GHz tunable optical frequency comb with 0.02 nm resolution bandwidth according to an embodiment of the invention.

Two tunable optical combs 162, 163 ($TOC_1$ and $TOC_2$) were generated using a cavity-less seed source, as shown in the experimental setup in FIG. 16B. The master seed for both TOCs 162, 163 was a single, narrow-linewidth master oscillator 160 operating at 1559.2 nm. Each TOC includes a pulse generation stage 150, a pulse compression stage 152 and a comb generation stage 153, as shown in FIG. 16A. The master oscillator was split into two paths with a 3 dB coupler 173 to seed both TOCs. In TOC 162, broad optical pulses were carved with a Mach-Zehnder modulator (MZM) 165, which uses the RF signal, in this case, a 25 GHz RF tone 161, to modulate the optical carrier. It will be apparent to one of skill in the art that other types of optical modulators may be used to achieve the same modulation. Next, in pulse compression stage 152, the broad pulses were first chirped using a phase modulator (PM) 166 driven with the 25 GHz tone 161. The chirped pulses were then compressed in single mode fiber (SMF) 167. After amplification and subsequent filtering, the pulses were subjected to a second compression stage. The chirp in this stage was induced by self-phase modulation (SPM) in a highly nonlinear fiber (HNLF) 168. The pulse compression was again achieved in a second SMF stage 169. Next, the pulse pedestals were suppressed in a nonlinear optical loop mirror (NOLM) 170. Finally, the high peak power pulses were routed into a final HNLF stage 171 for generation of a wideband 25 GHz optical frequency comb. The high quality 25 GHz TOC with $OSNR_{0.1\ nm}$ over 40 dB and 0.02 nm resolution bandwidth is shown in FIG. 17. The second TOC 163 was generated as described for the first TOC but with a pitch of 24.92 GHz, resulting in a pitch offset of 80 MHz between the two generated combs.

Referring to FIG. 16B, the 25 GHz comb 162 was sent to a MZM 175, where the received electrical signal was modulated onto each of the comb tones. The electrical signal was synthesized using a 64 GS/s digital to analog converter (DAC) 176. The DAC was programmed with the FH-PPM data and was electrically amplified and used to modulate the comb. Subsequently, the two generated optically frequency combs were sent to a constructed coarse spectral demultiplexer (DMUX) 177. The DMUX block consisted of a bank of wavelength division multiplexers (WDM) that emulated a conventional (single-element) spectral DMUX with 400 GHz spacing. As a result, a 16 port spectral DMUX was realized, each with 16 adjacent optical frequency tones spaced 25 GHz apart. Each of the 16 ports carried 16 tone-signal pairs each from the signal comb and the overlapping 16 tones from the reference comb. Each of these was then routed into a separate coherent receiver 178. The received data was then captured with a bank of 32 ADCs 179, one for each quadrature, each operating at 1.28 GS/s. As a result, each pair of receivers yields 16 DFT coefficients at a 12.5 ns (1/80 MHz) update rate.

After capturing all 16 I/Q channels, DSP was applied to extract each of the 256 DFT coefficients, using the frequency shift-and-subtract method. Subsequently, with 256 estimated DFT coefficients spanning 20.48 GHz, the bandwidth of interest is selected, and the phase is calculated in each of the corresponding DFT coefficients. Finally, the phase slope is estimated using physically acquired DFT coefficients, and the pulse position is extracted. This process is repeated for each of the transmitted pulses.

The system performance was characterized first with an 80 Mbps PPM signal. The pulses generated were raised cosine shaped pulses with 0.25 roll-off factor, 320 MHz bandwidth, 20 MHz average repetition rate, and modulated with 16 time positions. The electrical signal was also up-converted to 1.92 GHz, and for this initial test, no frequency hopping was used. The electrical PPM signal was modulated onto the 25 GHz optical frequency comb and subsequently sent to the receiver backplane. After estimating the phase slope from the resulting DFT coefficients, the received PPM stream was estimated.

Figure 18A:
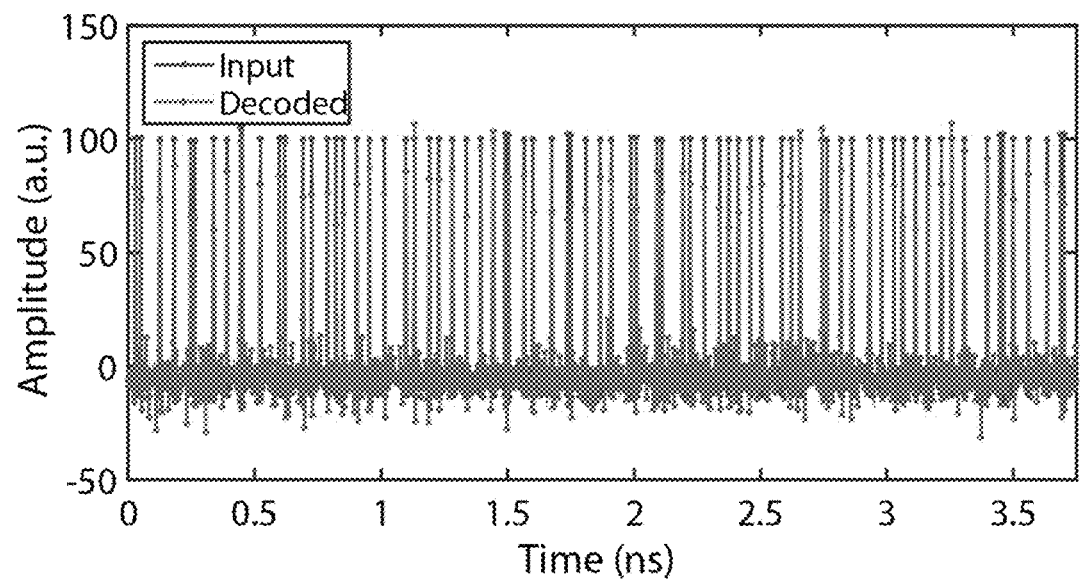
FIGS. 18A and 18B are plots of transmitted and received PPM signals at 80 and 160 Mbps, respectively.
Figure 19:
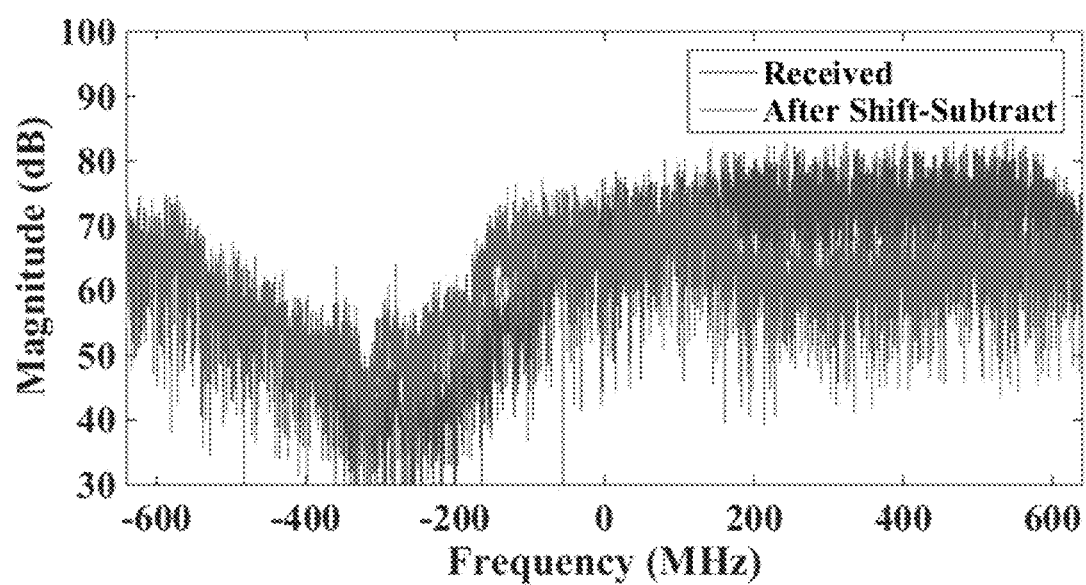
FIG. 19 shows the electrical spectrum before and after the shift-subtract operation.

The performance of the new receiver architecture was characterized in two ways. First, the inverse Fourier transform was performed using the received DFT coefficients, constructing time-domain data which was then compared to the transmitted pulse stream. Second, the SNR at the output was measured, defined as the amplitude squared of the received data where a pulse is present divided by the variance of the received noise. The inverse Fourier transform implemented here was only used for characterization of the receiver architecture: the new receiver does not need an inverse Fourier transform to be computed since only the slope of the phase function needs to be estimated. The performance results are plotted as amplitude versus time in FIG. 18A, showing a successful demodulation of the transmitted 80 Mbps PPM signal, achieving a SNR of 23.2 dB at the receiver. In FIG. 19, the measured results both before ("Received"—blue lines) and after the shift and subtract rectification (orange lines) are shown. The performance of the receiver is greatly limited by the accuracy of the shift and subtract method. Ideally, a full receiver backplane would overcome this limitation.

Figure 18B:
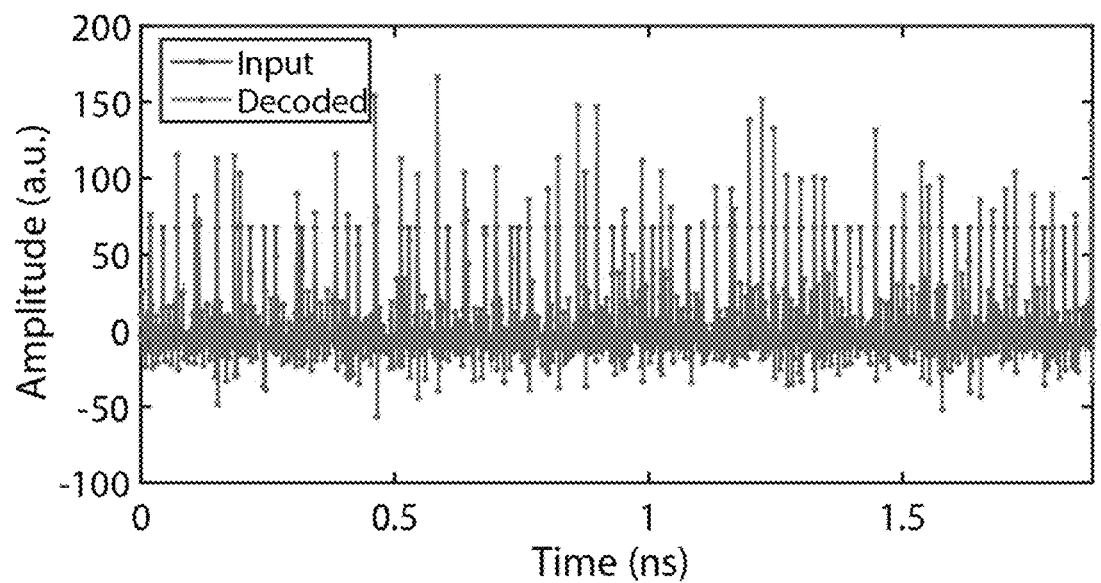

The system performance was also characterized for a faster signal, consisting of a 160 Mbps PPM signal. The 160 Mbps PPM signal consisted of raised cosine pulses, 640 MHz bandwidth, 40 MHz average repetition rate, and 16 modulated pulse time positions. The PPM signal was then upconverted to 1.28 GHz. The performance results of the demodulation are plotted in FIG. 18B. Even at double the data rate, the receiver can still demodulate the PPM data successfully. The 160 Mbps PPM channel was characterized with 15.2 dB SNR, indicating the scalability of this architecture. The performance was again limited by the shift and subtract method, and due to having a larger bandwidth, or equivalently, possessing more DFT coefficients to estimate, the shift and subtract method performed even more poorly. Still, the receiver architecture was successfully scaled to double the original data rate, and could nevertheless be demodulated. Indeed, with a full receiver backplane, the shift and subtract method would not be necessary, and as a result, the performance of the receiver would be significantly better.

Figure 20A:
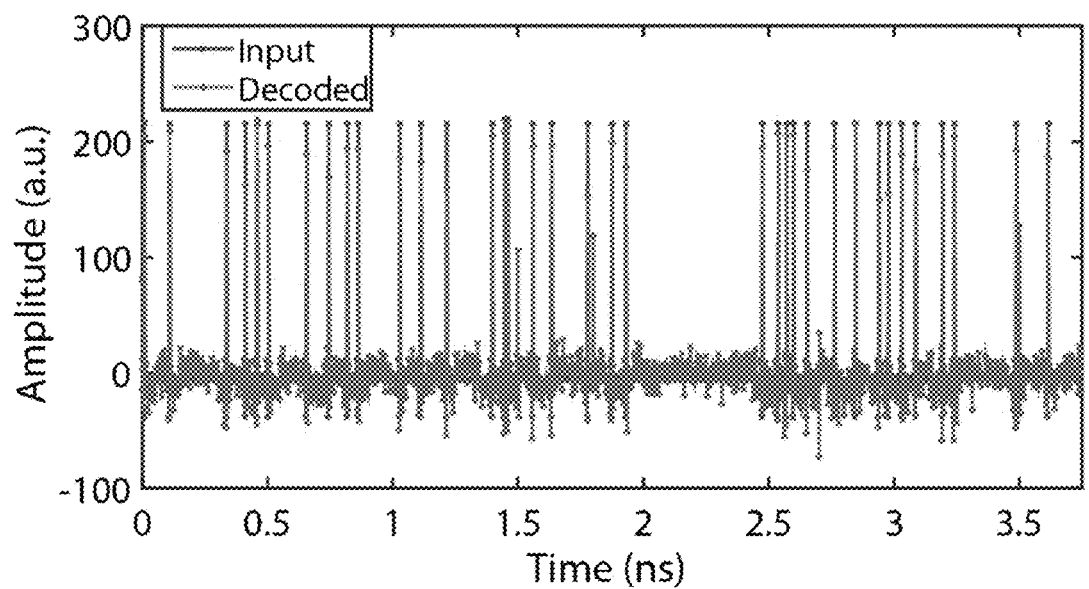
FIGS. 20A and 20B are plots of transmitted and received 80 Mbps PPM signal frequency hopping between 1.6 GHz and 4.16 GHz, respectively.
Figure 20B:
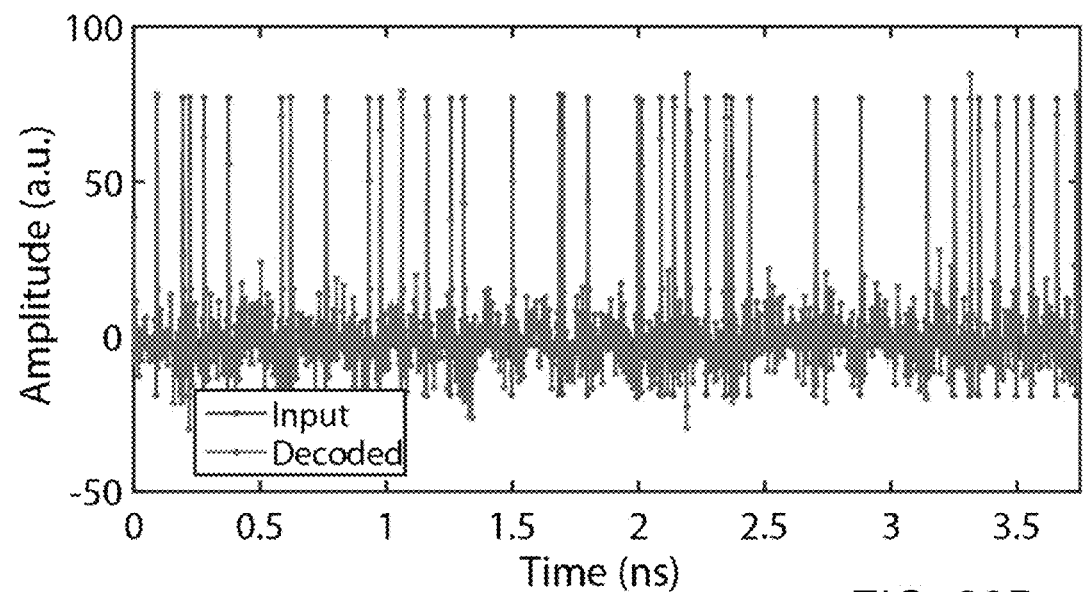

Finally, to demonstrate the versatility of the proposed receiver, frequency hopping was implemented. In this test, an 80 Mbps PPM signal with 20 MHz average repetition rate, 320 MHz bandwidth, and 16 pulse positions was generated. The signal was programmed to randomly frequency hop between 1.6 GHz and 4.16 GHz carrier frequencies with 20 MHz average hopping rate. The carrier frequencies were specifically chosen so that the signal would fall into two distinct receivers. The two coherent receivers starred at the frequency ranges of 1.28 GHz to 2.56 GHz and 3.84 GHz to 5.12 GHz, respectively. The performance of the reception in each receiver is shown in FIGS. 20A and 20B. The two receivers were successful in capturing both carrier frequencies, allowing for accurate demodulation of the transmitted PPM signal. The receiver was characterized with 19.8 dB and 13.4 dB SNR for the 1.6 GHz, and 4.16 GHz carrier frequencies, respectively.

The above-described frequency hopping PPM approach provides a low-complexity receiver and requires only a linear phase estimator to successfully demodulate a FH-PPM signal. A full-scale architecture, populated with subrate detector array, circumvents the need for iterative DFT recovery, since each frequency component is addressed independently by a single (low-rate) receiver. The unique ability to simultaneously address a large RF bandwidth that exceeding 20 GHz, and support high frequency resolution was leveraged to detect and demodulate a frequency hopping UWB PPM signal experimentally for the first time.

Example 2: Cyclostationary Analysis

In cyclostationary (CS) analysis, spectral computation must be performed over multiple modulation cycles. A conventional cyclostationary receiver must perform DFT in real-time in order to complete the acquisition chain. Current all-electronics DFT technology limits real-time spectral bandwidth to sub-GHz-scale range—two orders of magnitude below the needs of future EW spectral range (>110 GHz).

Incorporation of the inventive mutually-coherent frequency comb structure into a CS analyzer architecture for signal replication and frequency decomposition can completely eliminate a high bandwidth ADC and dispenses with the need for computational Fourier mapping of the received emission.

Example 3: Wirespeed Pattern Recognition

Real-time pattern recognition poses technology limit in both imaging, SIGINT and cyber-defense fields. Terabit-per-second-capacity lightwave channels that carry high-capacity terrestrial and submarine fiber data traffic present an enormous challenge to analyze an anomalous traffic pattern in real time. In practical terms, this means that DFT of Terabit-class stream must be computed at wirespeed, i.e., at latency that is comparable to a lightwave packet traversing the localized segment of fiber. A DFT coprocessor architecture that employs the physically-assisted computing enabled by the mutually-coherent frequency comb of the present invention would be capable of real-time, continuous operation that approaches or even matches a lightwave channel rate.

REFERENCES

Incorporated Herein by Reference

[1] K. Siwiak and D. McKeown, *Ultrawideband Radio Technology*, John Wiley, Chichester, 2004.
[2] J. Proakis, *Digital Communications*, McGraw-Hill, New York, 2012.
[3] K. Siwiak, "Ultra-Wideband Radio: Introducing a New Technology", Vehicular Technology Conference, p. 1088, 2001.
[4] R. A. Scholtz, "Multiple Access with Time-Hopping Impulse Modulation", *MILCOM* 93, p. 1, 1993.
[5] M. Z. Win and R. A. Scholtz, "Ultra-wide bandwidth time-hopping spread-spectrum impulse radio for wireless multiple-access communications," *IEEE Trans. Commun.*, vol. 48, no. 4, pp. 679-691, 2000.
[6] A. Lopez-Salcedo, and G. Vazquez, "Detection of PPM-UWB Random Signals," *IEEE Transactions on Signal Processing*, vol. 56, no. 5, pp. 2003-2016, 2008
[7] G. S. Biradar, et al., "An adaptive frequency and time hopping PPM UWB for multiple access communication," in *Proc. IEEE Conf. Information Commun., and Signal Processing(ICICS)*, pp. 1-5, Singapore, 2007
[8] First Report and Order, Revision of Part 15 of the Commission's Rules Regarding Ultra-Wideband Trans-

[9] M. Z. Win and R. A. Scholtz, "Impulse radio: How it works," *IEEE Commun. Lett.*, vol. 2, pp. 36-38, February 1998.

[10] T. Muoi and J. Hullett, "Receiver Design for Optical PPM Systems", *IEEE Trans. Communications*, V26, p. 295, 1978.

[11] B. Murmann, ADC Performance Survey 1997-2015, on the worldwide web at stanford.edu/~murmann/adcsurvey.html (2015).

[12] V. Ataie, et al., "Subnoise detection of a fast random event," *Science* 350(6266), 1343-1346 (2015).

[13] G. W. Anderson, et al., "Advanced channelization for RF, microwave, and millimeter wave applications", *Proc. Of IEEE*, V. 79, p. 355, 1991.

[14] E. Myslivets, et al., "Generation of wideband frequency combs by continuous-wave seeding of multistage mixers with synthesized dispersion," *Optics Express*, Vol. 20, No. 3 (Jan. 30, 2012), pp. 3331-3344.

[15] B. P.-P. Kuo, et al., "Wavelength multicasting via frequency comb generation in a bandwidth-enhanced fiber optical parametric mixer," *J. Lightwave Technology*, Vol. 29, No. 23 (Dec. 1, 2011), pp. 3515-3522.

[16] V. Ataie, et al., "Spectrally equalized frequency comb generation in multistage parametric mixer with nonlinear pulse shaping," *Journal of Lightwave Technology*, Vol 32, No. 4 (Feb. 15, 2014), pp. 840-846.

[17] R. Wu, V. Tones-Company, et al., "Supercontinuum-based 10-GHz flat-topped optical frequency comb generation", *Optics Express*, Vol. 21, Issue 5, pp. 6045-6052 (2013).

[18] J. Pfeifle et. al. "Coherent terabit communications with microresonator Kerr frequency combs". *Nat. Photonics*, p. 375, 2014.

[19] P. J. Delfyett, et. al, "Optical frequency combs from semiconductor lasers and applications in UWB signal processing and communications," *J. Lightwave Technol.* 24, 2701-2719 (2006).

[20] S. Radic, "Parametric signal processing", *IEEE Journal of Selected Topics in Quantum Electronics*, Vol. 18, No. 2 (March/April 2012), pp. 670-680. 2012.

[21] Winograd (*Mathematics of Computation*, 32(141):175-199, 1978).

[22] H. Sorensen et al., *IEEE Transactions on Acoustics, Speech and Signal Processing*, Vol. 34, pp. 152 1986.

[23] S. Savory, "Digital Signal Processing for Coherent Systems," OFC/NFOEC *Technical Digest*, OTh3C7, 2012.

[24] J. W. Goodman, *Introduction to Fourier Optics*, McGraw-Hill (1968).

[25] W. A. Gardner, et al., "Cyclostationarity: Half a century of research," *Signal Proc.*, vol. 86, no. 4, pp. 639-697, April 2006.

The invention claimed is:

1. A receiver comprising:
    a mutually-coherent optical comb pair comprising a first comb and a second comb, the second comb having a frequency pitch offset with respect to a frequency pitch of the first comb, each comb generating a plurality of optical tones to produce a plurality of mutually-coherent optical tone pairs, wherein each optical tone generated by the first comb has replicated thereon an input signal having an input bandwidth, and each optical tone generated by the second comb is a reference;
    a spectral demultiplexer configured for receiving and separating the plurality of optical tones pairs into spectral channels;
    a plurality of coherent detector elements, each detector element corresponding to a spectral channel and configured for unfiltered detection of a corresponding optical tone pair, wherein the plurality of detector elements generates a decomposed spectrum based on the plurality of optical tone pairs; and
    a plurality of digitizers configured for measuring a plurality of transform coefficients corresponding to the decomposed spectrum.

2. The receiver of claim 1, wherein the plurality of transform coefficients comprises discrete Fourier transform (DFT) coefficients or discrete Hilbert transform (DHT) coefficients.

3. The receiver of claim 1, wherein the input signal is in an optical domain, and further comprising a multiplexer for combining the input signal with a seed signal prior to comb generation.

4. The receiver of claim 1, wherein the input signal is in a radio-frequency domain, and further comprising a modulator for modulating the plurality of optical tones with the input signal.

5. The receiver of claim 1, wherein the mutual comb coherency is achieved by mixer seeding and where at least one seed signal is generated by a master laser emitter.

6. The receiver of claim 5, wherein the at least one seed signal is generated by multiple laser emitters configured for mutual coherence.

7. The receiver of claim 6, wherein one of the multiple laser emitters is a slave emitter and mutual coherence is achieved by injection locking of the slave emitter.

8. The receiver of claim 6, further comprising a common reference signal, wherein mutual coherence is achieved by feedback from the common reference signal to the mutual laser emitters.

9. The receiver of claim 1, wherein the one or more coherent detector elements comprises a plurality of detector elements, each having a response bandwidth much smaller than the input bandwidth.

10. The receiver of claim 1, wherein the second comb has a comb tone power and a phase shaped to aid extraction of DFT or DFT coefficients.

11. The receiver of claim 1, wherein first comb has a comb tone power and phase shaped to aid extraction of DFT or DFT coefficients.

12. A receiver comprising:
    a signal replication mixer configured for generating a plurality of signal optical tones across a frequency spectrum and having a frequency pitch, each signal optical tone having an input signal replicated thereon, the input signal having an input bandwidth;
    a reference mixer configured for generating a plurality of reference optical tones having an offset frequency pitch; and
    a backplane configured for unfiltered detection of coherent beating between the signal optical tones and the reference optical tones.

13. The receiver of claim 12, wherein the signal replication mixer and the reference mixer comprise a mutually-coherent frequency comb pair.

14. The receiver of claim 12, wherein the signal replication mixer and the reference mixed are seeded by a single master laser emitter.

15. The receiver of claim 12, wherein the signal replication mixer and the reference mixed are seeded by separate laser emitters configured for mutual coherence.

16. The receiver of claim 15, wherein one of the separate laser emitters is a slave emitter and mutual coherence is achieved by injection locking of the slave emitter.

17. The receiver of claim 15, further comprising a common reference signal, wherein mutual coherence between the separate laser emitters is achieved by feedback from the common reference signal to the separate laser emitters.

18. The receiver of claim 12, wherein the backplane includes a plurality of coherent detector elements, with one coherent detector element corresponding to each signal optical tone.

19. The receiver of claim 18, wherein each coherent detector element has a response bandwidth much smaller than the input bandwidth.

20. The receiver of claim 18, wherein the backplane further comprises:
   a plurality of digitizers; and
   a digital signal processor (DSP) configured to measure transform coefficients corresponding to each optical tone.

21. The receiver of claim 20, wherein the transform coefficients comprise discrete Fourier transform (DFT) coefficients or discrete Hilbert transform (DHT) coefficients.

22. The receiver of claim 12, wherein the input signal is in an optical domain, and further comprising a multiplexer for combining the input signal with a seed signal prior to comb generation.

23. The receiver of claim 12, wherein the input signal is in a radio-frequency domain, and further comprising a modulator for modulating the plurality of signal optical tones with the input signal.

24. The receiver of claim 12, wherein the reference optical tones have power and a phase shaped to aid extraction of DFT or DFT coefficients.

25. The receiver of claim 12, wherein signal optical tones have a tone power and phase shaped to aid extraction of DFT or DFT coefficients.

\* \* \* \* \*